United States Patent
Fujimoto et al.

(10) Patent No.: US 7,126,758 B2
(45) Date of Patent: Oct. 24, 2006

(54) ZOOM LENS SYSTEM AND IMAGE PICKUP APPARATUS HAVING THE SAME

(75) Inventors: Makoto Fujimoto, Tokyo (JP); Akihiro Nishio, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/149,035

(22) Filed: Jun. 8, 2005

(65) Prior Publication Data
US 2005/0275949 A1    Dec. 15, 2005

(30) Foreign Application Priority Data
Jun. 9, 2004    (JP)    .............................. 2004-171381

(51) Int. Cl.
*G02B 15/14*    (2006.01)
(52) U.S. Cl. ...................... 359/676; 359/683; 359/684; 359/685; 359/686; 359/689; 359/691; 359/740; 359/557
(58) Field of Classification Search ........ 359/676–692, 359/740, 557
See application file for complete search history.

(56) References Cited

U.S. PATENT DOCUMENTS

| 5,751,485 A | * | 5/1998 | Suzuki | .................... 359/689 |
| 5,835,272 A | | 11/1998 | Kodama | |
| 6,025,962 A | | 2/2000 | Suzuki | |
| 6,124,972 A | | 9/2000 | Hayakawa et al. | |
| 6,266,189 B1 | | 7/2001 | Konno et al. | |

FOREIGN PATENT DOCUMENTS

| JP | 7-325272 A | 12/1995 |
| JP | 8-136862 A | 5/1996 |
| JP | 9-30237 A | 9/1997 |
| JP | 10-39210 A | 2/1998 |
| JP | 10-90601 A | 4/1998 |
| JP | 11-231220 A | 8/1999 |

* cited by examiner

Primary Examiner—Evelyn A. Lester
(74) Attorney, Agent, or Firm—Morgan&Finnegan LLP

(57) ABSTRACT

Disclosed is a compact zoom lens system having a image stabilizing function. This zoom lens system is provided with a plurality of lens units of which the interval between adjacent ones is changed during zooming. Shake correction is effected by a part of a lens unit of negative optical power of the plurality of lens units. Specifically, the lens unit of negative optical power is comprised of two lens components of negative optical power, and one of these two lens components is moved so as to have a component in a direction perpendicular to an optical axis to thereby change the imaging position of the zoom lens system.

18 Claims, 25 Drawing Sheets

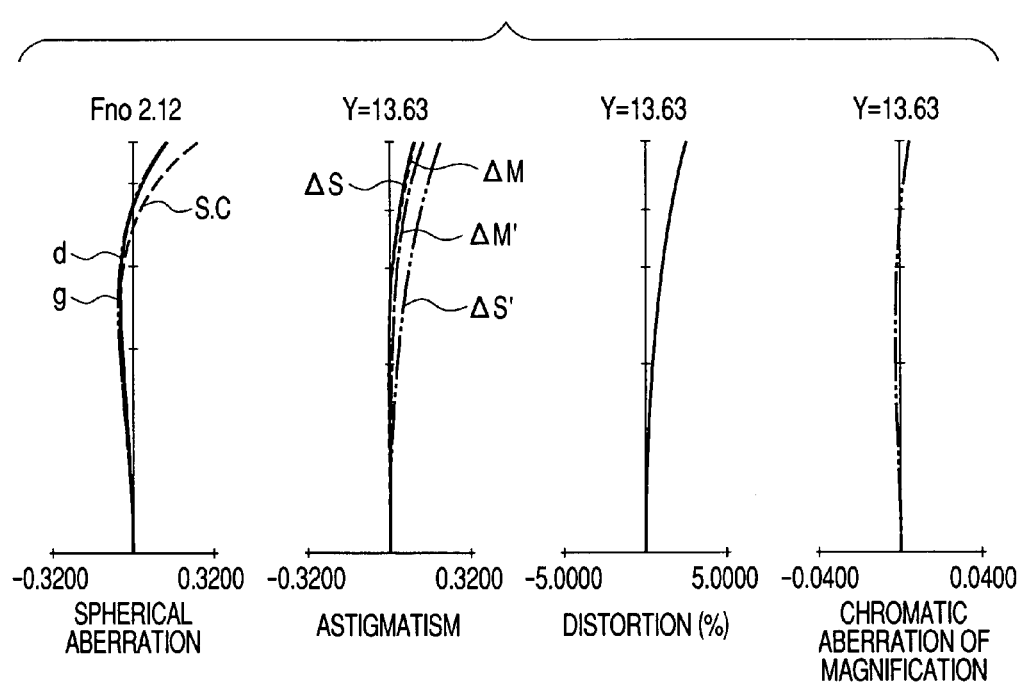

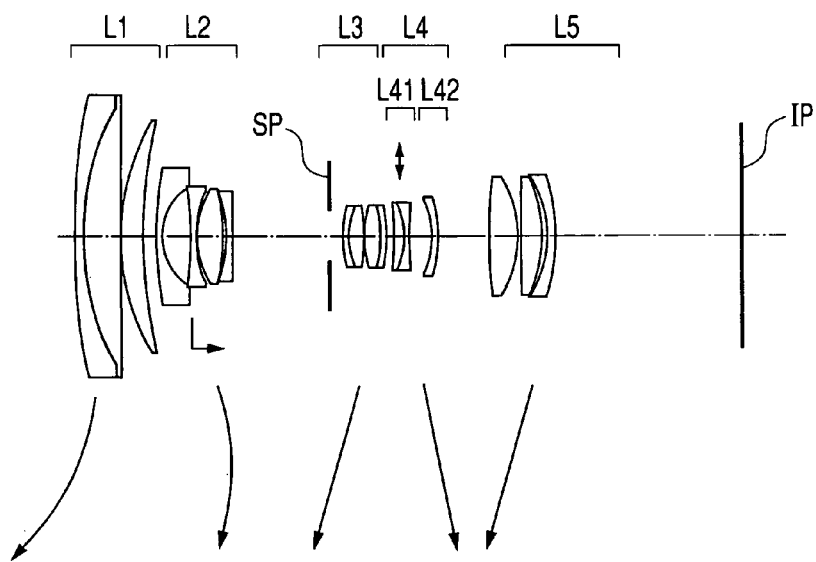
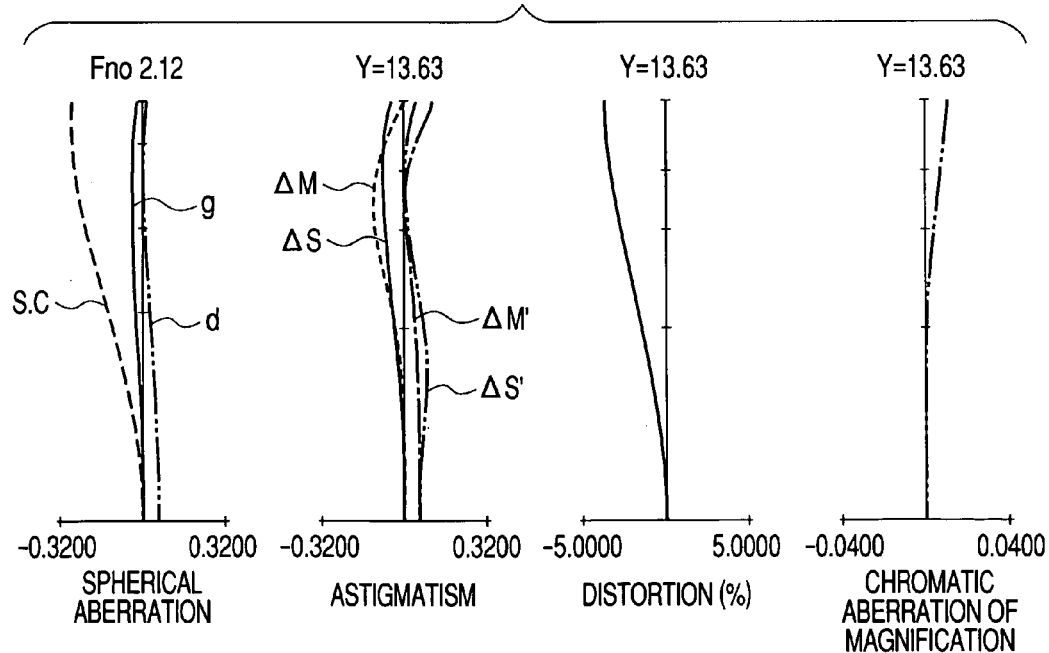

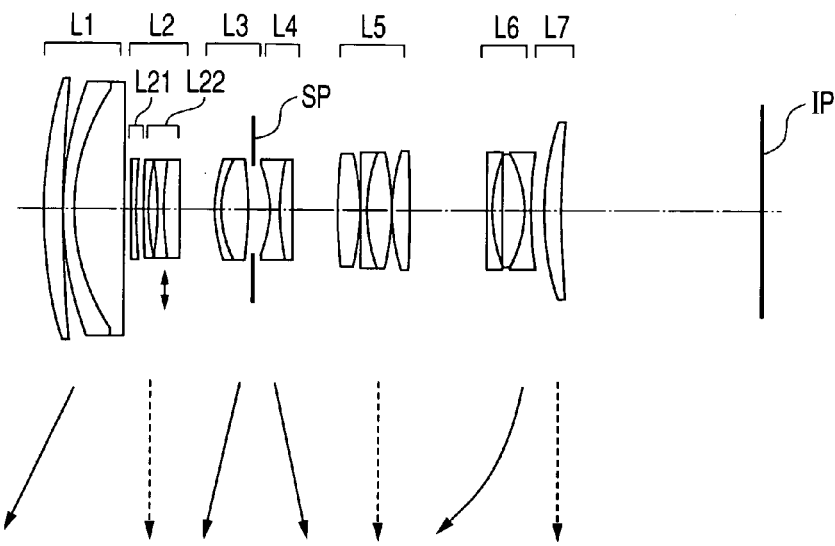
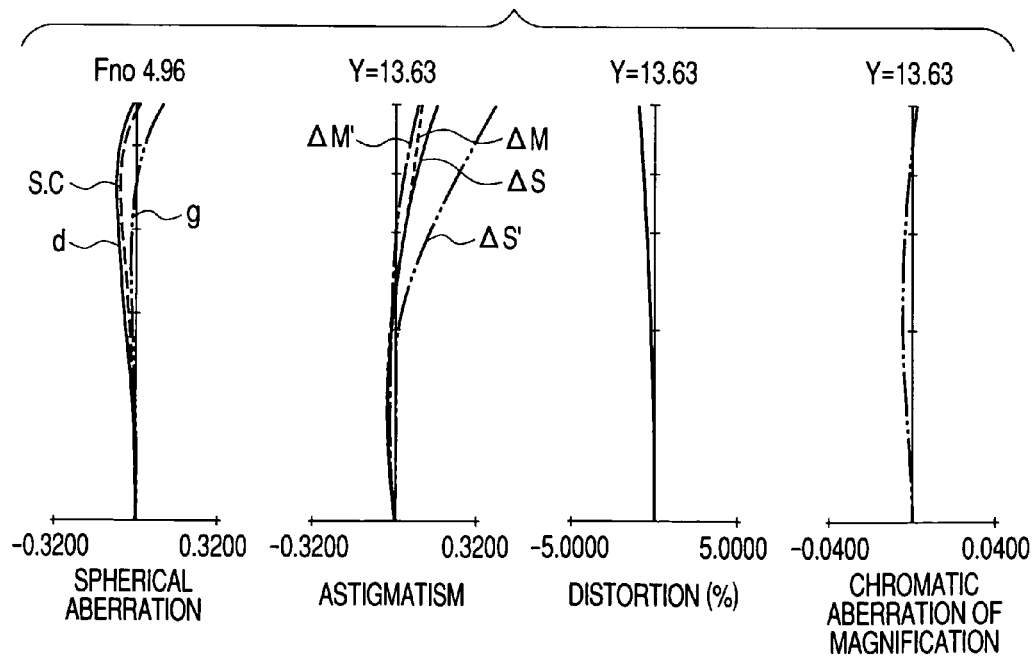

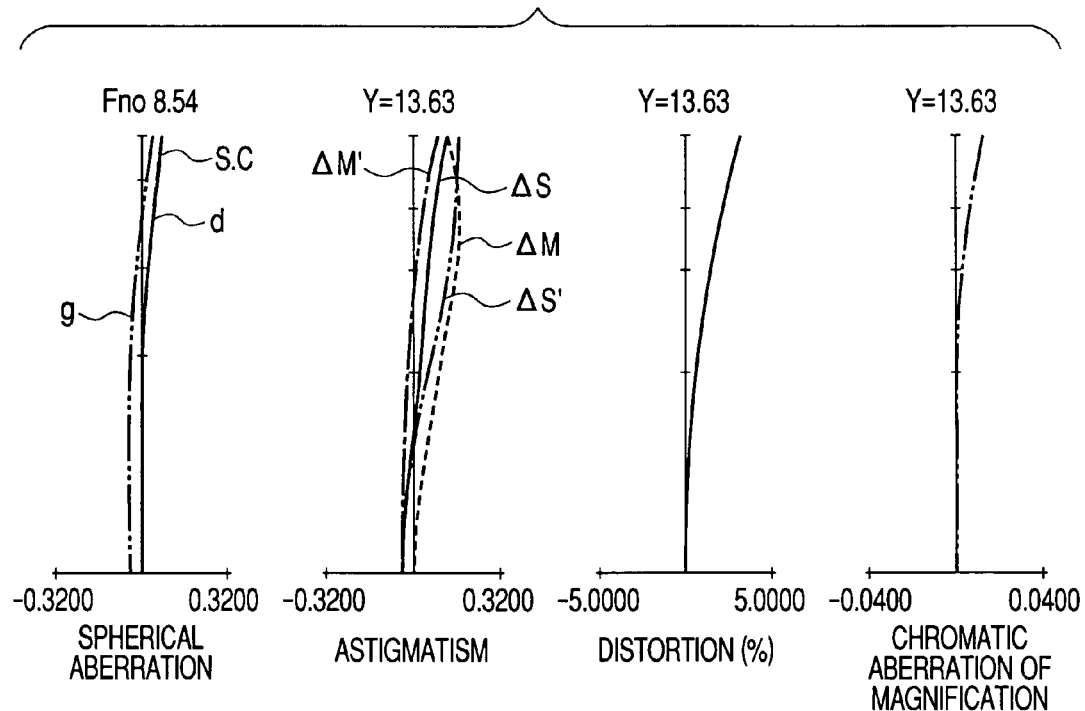

ZOOM LENS SYSTEM AND IMAGE PICKUP APPARATUS HAVING THE SAME

BACKGROUND OF THE INVENTION

1. Field of the Invention

This invention relates to a zoom lens system, and is suitable, for example, as the photo-taking optical system of a photographic camera, a video camera, a digital still camera or the like.

2. Description of the Related Art

When a shake is accidentally transmitted to a photographing system, blur occurs to a photographed image. There have heretofore been proposed various zoom lenses provided with a function of compensating for the blur of an image (image stabilizing function) due to such accidental shake. There are known, for example, optical systems which compensate for image blur due to a shake with a part of a lens unit constituting the optical system (zoom lens) moved in a direction substantially perpendicular to the optical axis thereof (Japanese Patent Application Laid-open No. H08-136862 (corresponding to U.S. Pat. No. 6,124,972), Japanese Patent Application Laid-open No. H07-325272, Japanese Patent Application Laid-open No. H09-230237 (corresponding to U.S. Pat. No. 6,266,189), Japanese Patent Application Laid-open No. H10-039210 (corresponding to U.S. Pat. No. 5,835,272), Japanese Patent Application Laid-open No. H11-231220 and Japanese Patent Application Laid-open No. H10-090601 (corresponding to U.S. Pat. No. 6,025,962).

Generally, when a photographing system is inclined by a shake, a photographed image is displaced by an amount conforming to the angle of inclination thereof and the focal length of the photographing system. Therefore, in an image pickup apparatus for a still image, there is the problem that a photographing time must be made sufficiently short to prevent the quality of image from deteriorating, and in an image pickup apparatus for a moving image, there is the problem that it becomes difficult to maintain the setting of composition. Therefore, in case of such photographing, it becomes necessary to correct so that the displacement of a photographed image, i.e., the so-called blur of a photographed image, may not occur even when the photographing system is inclined by a shake. Japanese Patent Application Laid-open No. H08-136862 discloses an embodiment suitable for being applied chiefly to a standard zoom lens for a single-lens reflex camera. Japanese Patent Application Laid-open No. H08-136862 discloses a construction which compensates for the blur of a photographed image by moving a second lens unit in a direction substantially perpendicular to the optical axis thereof, in a four-unit zoom lens comprised, in succession from the object side, of a first lens unit having positive refractive power, the second lens unit having negative refractive power, a third lens unit having positive refractive power and a fourth lens unit having positive refractive power.

Also, Japanese Patent Application Laid-open No. H07-325272, Japanese Patent Application Laid-open No. H09-230237, Japanese Patent Application Laid-open No. H10-039210 and Japanese Patent Application Laid-open No. H11-231220 disclose a form in which a movable lens unit is divided into two lens components to make shake correction performance and other performance compatible, and one lens component is a lens unit for shake correction.

Japanese Patent Application Laid-open No. H10-90601 discloses a construction which compensates for the blur of an image by moving the fourth lens unit having negative refractive power of a five-unit zoom lens comprised, in succession from the object side to the image side, of a first lens unit having positive refractive power, a second lens unit having negative refractive power, a third lens unit having positive refractive power, a fourth lens unit having negative refractive power and a fifth lens unit having positive refractive power.

In recent years, in single-lens reflex cameras, a digital single-lens reflex camera using a solid-state image pickup device such as a CCD sensor or a CMOS sensor as an image sensor is becoming a mainstream instead of a conventional silver-halide film camera. As this digital camera, there is demanded one of a simple construction.

Also, there have been manufactured a number of digital single-lens reflex camera using an image sensor of a size similar to APS size smaller than the same 135 size as silver-halide film, and a photo-taking optical system suitable therefor is also demanded. When the size of the image sensor becomes small, the field angle becomes narrow as compared with the 135 size and therefore, if in a zoom lens covering a wide angle to medium telephoto focal length, a zoom lens in which the image size is the 135 size is intactly made to have the same field angle, the entire optical system becomes bulky. For example, if in a zoom lens used in a camera of APS size, an attempt is made to obtain the same field angle as that of a zoom lens having a focal length of 28–135 mm and directed to the 135 size, the focal length will become 17.5–85 mm. If a zoom lens having a focal length of 17.5–85 mm is designed at an image size of the 135 size, the optical system will become bulky.

So, there is demanded an exclusive zoom lens corresponding to an image size smaller than the 135 size, for example, APS size.

On the other hand, of a mechanism which shakes some lens units of a photographing system to thereby eliminate the blur of an image and obtain a still image, it is required that the correction amount of the blur of the image be great, that the amount of movement or the amount of rotation of a lens unit to be shaken in order to correct the blur of the image (image stabilizing lens unit) be small, that the entire apparatus be compact, and the like.

Now, assuming that the ratio $|\Delta x/\Delta h|$ of the correction amount $\Delta x$ of the blur of an image to the unit movement amount $\Delta h$ of the image stabilizing lens unit in a direction perpendicular to the optical axis thereof is defined as eccentricity sensitivity TS, the eccentricity sensitivity TS is defined as $$TS=|\Delta x/\Delta h|.$$

Also, letting f be the focal length, and BS (degrees/mm) be shake correction sensitivity which is defined as $$BS=(180/\pi)\times TS/f,$$

the shake correction sensitivity BS is indicative of a shake correction angle relative to the unit movement amount of the image stabilizing lens unit in the direction perpendicular to the optical axis thereof. The accuracy with which the image stabilizing lens unit is controlled depends greatly on the resolution of an actuator which moves the image stabilizing lens unit, and when the shake correction sensitivity BS is too high, a problem occurs to stopping accuracy. Also, when the shake correction sensitivity BS is too low, the amount of movement of the image stabilizing lens unit for the purpose of shake correction becomes great, thus resulting in an increase in electric power consumption and the bulkiness of the optical system.

FIG. 18 of the accompanying drawings is an illustration showing the field angle characteristic of the shake correction sensitivity BS.

Generally, as shown in FIG. 18, it is necessary for the shake correction sensitivity BS be within a desired value range in conformity with the field angle of the optical system.

Further, in the case of an optical systems of the same field angle, it is preferable that the shake correction sensitivity BS be of a value within the same range irrespective of the size of an image circle.

In a zoom lens provided with a image stabilizing function directed to an image pickup device of an image circle smaller than the 135 size, if an attempt is made to design an optical system of the same field angle as the 135 size, there is the problem that the eccentricity sensitivity BS of the image stabilizing lens unit at the telephoto end becomes too high and highly accurate shake correction performance becomes unobtainable. If an attempt is made to intactly apply an optical system for the 135 size to an optical system of an image circle of a size smaller than the 135 size, for example, APS size, shake correction sensitivity becomes high in inverse proportion to the difference in the focal length. That is, assuming that in an optical system of the 135 size and having a focal length of 28–135 mm, the shake correction sensitivity BS at the telephoto end is 0.7 degree/mm, the focal length is 17.5–85 mm for APS size and the shake correction sensitivity at the telephoto end is 0.7× 135÷85=1.1 degree/mm. The field angle is the same and therefore, even in the case of APS size, it is necessary to provide the same degree of shake correction sensitivity BS, but if an attempt is made to make the eccentricity sensitivity TS low, it is necessary to make the optical power (inverse number of the focal length) of the image stabilizing lens unit small, and this results in the aggravation of aberrations and an increase in the entire length of the optical system.

A construction in which a movable lens unit of negative refractive power is divided into two lens components having negative refractive power is disclosed in a first embodiment and a second embodiment of the aforementioned Japanese Patent Application Laid-open No. H07-325272, a first embodiment and a fourth embodiment of Japanese Patent Application Laid-open No. H09-230237, a first embodiment of Japanese Patent Application Laid-open No. H10-039210 and first to seventh embodiments of Japanese Patent Application Laid-open No. H11-231220.

In the first embodiment and the second embodiment of Japanese Patent Application Laid-open No. H07-325272, disclosed is a zoom lens comprised of a plurality of lens units including a first lens unit having positive refractive power and in which a lens unit having negative refractive power is constituted by two lens components having negative refractive power and shake correction is effected by one of the lens components, and this lens unit having negative refractive power is a second lens unit disposed on the object side with respect to an aperture stop. Also, the eccentricity sensitivity TS of the lens component effecting shake correction is −1.615 in the first embodiment, and −17.43 in the second embodiment.

Also in the first embodiment and the fourth embodiment of Japanese Patent Application Laid-open No. H09-230237, disclosed is a zoom lens constituted by a plurality of lens units including a first lens unit having positive refractive power, and in which a lens unit having negative refractive power is constituted by two lens components having negative refractive power and shake correction is effected by one on the lens components, and this lens unit having negative refractive power is also disposed on the object side with respect to an aperture stop. Also, the shake correction sensitivity of the lens component effecting shake correction is −1.644 in the first embodiment, and −1.650 in the fourth embodiment.

In the first embodiment of Japanese Patent Application Laid-open No. H10-039210, disclosed is a zoom lens in which a lens unit having negative refractive power is constituted by two lens components having negative refractive power and shake correction is effected by one of the lens components, and the eccentricity sensitivity TS of the lens component effecting shake correction is 1.631.

In the first to seventh embodiments of Japanese Patent Application Laid-open No. H11-231220, disclosed is a zoom lens in which a lens unit having negative refractive power is constituted by two lens components having negative refractive power and shake correction is effected by one of the lens components, and the eccentricity sensitivity TS of the lens component effecting shake correction is 1.692, 1.553, 1.551, 1.716, 1.691, 1.687 and 1.623 in the respective embodiments.

As described above, in these conventional examples, disclosed is a zoom lens in which the lens unit having negative refractive power is divided into two lens components and shake correction is effected by one of the lens components, but in any one of these conventional examples, the eccentricity sensitivity of the image stabilizing lens component is 1.5 or greater, and this is considerably great. This has led to the problem that it is very difficult to manufacture each lens unit.

SUMMARY OF THE INVENTION

The present invention has as its object the provision of a zoom lens system of a novel construction provided with a mechanism for shake compensation (image stabilizing).

An illustrative zoom lens system according to the present invention has a plurality of lens units of which the interval between adjacent ones is changed during zooming, and an aperture stop. Of the plurality of lens units, the lens unit disposed on the most object side has positive optical power. Further, the plurality of lens units have a lens unit having negative optical power disposed on the image side of the aperture stop. This lens unit having negative optical power is constituted by two lens components having negative optical power. One of these two lens components is moved so as to have a component in a direction perpendicular to an optical axis to thereby change the imaging position of the zoom lens system.

Also, another illustrative zoom lens system according to the present invention has a plurality of lens units of which the interval between adjacent ones is changed during zooming. The plurality of lens units include a lens unit having negative optical power. This lens unit having negative optical power is constituted by two lens components having negative optical power. One of these two lens components is moved so as to have a component in a direction perpendicular to an optical axis to thereby change the imaging position of the zoom lens system. Further, letting TS be a displacement of the imaging position of the zoom lens system when the aforementioned one lens component is moved by a unit amount, the condition that $$0.25 < TS < 1.25$$

is satisfied.

BRIEF DESCRIPTION OF THE DRAWINGS

FIGS. 3A, 3B, 3C and 3D show the aberrations of the zoom lens according to Embodiment 1 at the intermediate zoom position thereof.

FIG. 5 is a lens cross-sectional view of a zoom lens according to Embodiment 2.

FIGS. 6A, 6B, 6C and 6D show the aberration of the zoom-lens according to Embodiment 2 at the wide-angle end thereof.

FIG. 9 is a lens cross-sectional view of a zoom lens according to Embodiment 3.

FIGS. 10A, 10B, 10C and 10D show the aberrations of the zoom lens according to Embodiment 3 at the wide-angle end thereof.

FIGS. 11A, 11B, 11C and 11D show the aberrations of the zoom lens according to Embodiment 3 at the intermediate zoom position thereof.

DESCRIPTION OF THE PREFERRED EMBODIMENTS

Description will hereinafter be made of some embodiments of the zoom lens system of the present invention and an image pickup apparatus having the same.

Figure 1:
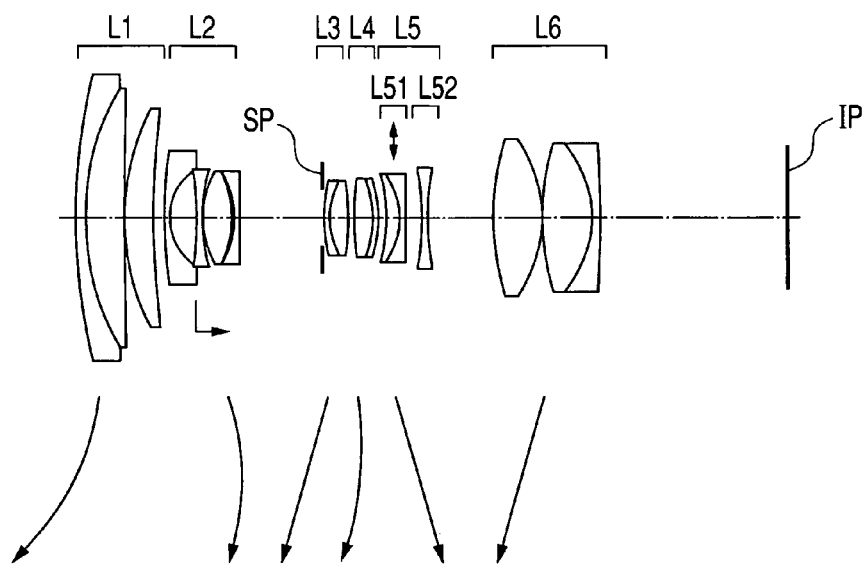
FIG. 1 is a lens cross-sectional view of a zoom lens according to Embodiment 1.
Figure 2A:
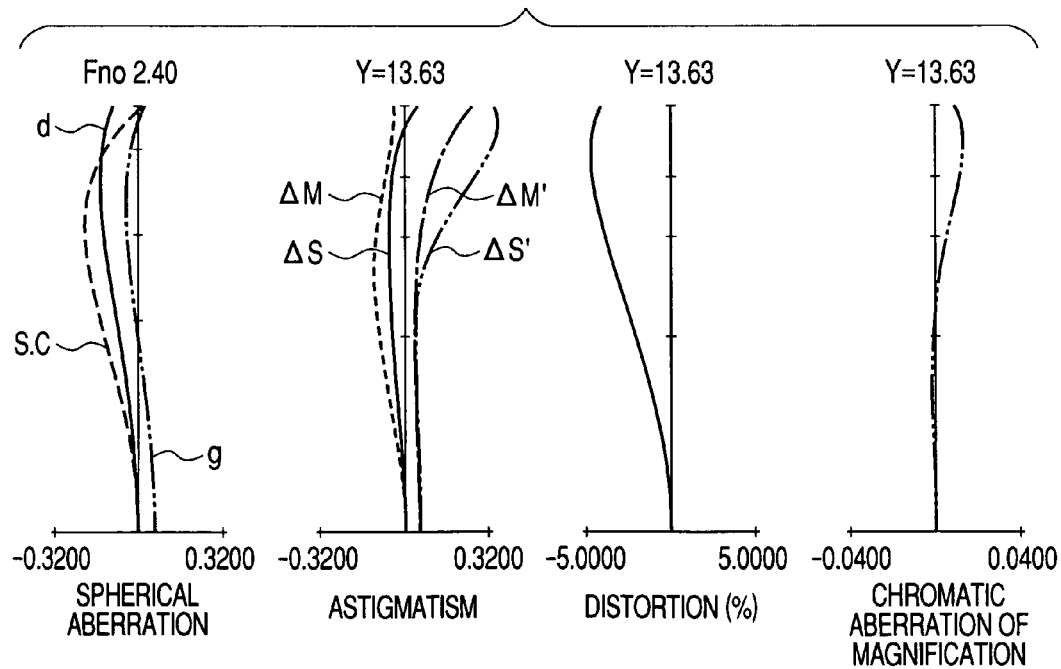
FIGS. 2A, 2B, 2C and 2D show the aberrations of the zoom lens according to Embodiment 1 at the wide-angle end thereof.
Figure 2B:
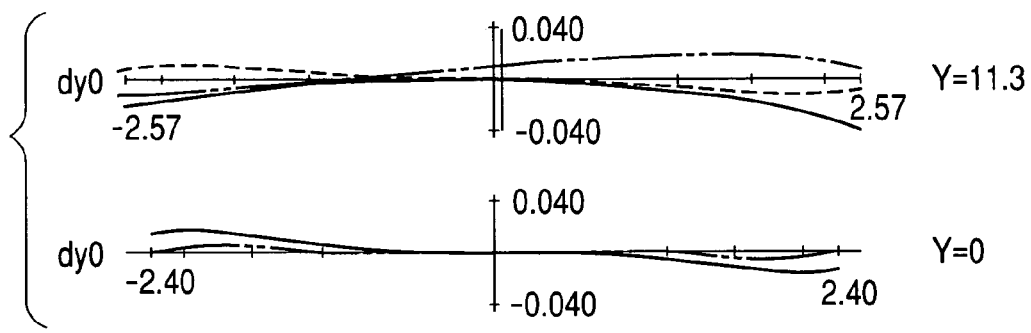
Figure 2C:
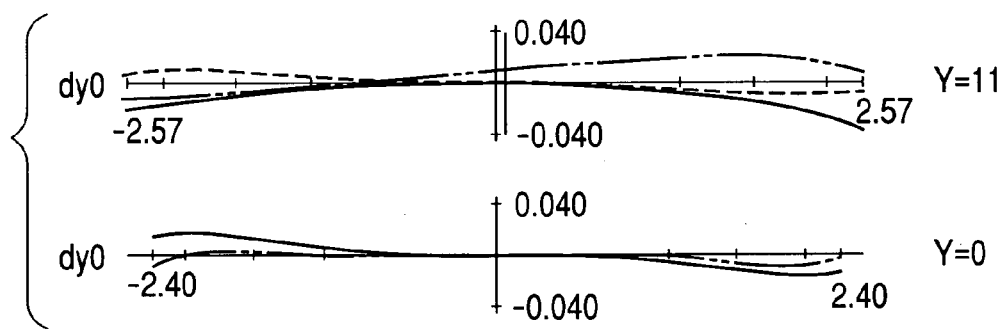
Figure 2D:
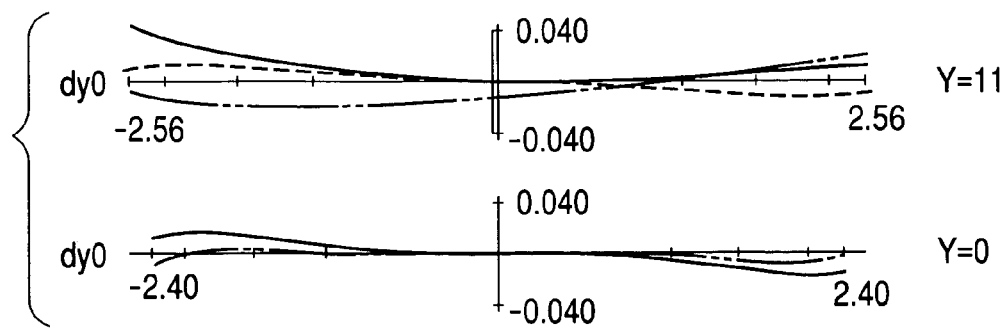

FIG. 1 is a lens cross-sectional view of a zoom lens according to Embodiment 1 at the wide-angle end (short focal length end) thereof, FIGS. 2A–2D show the aberrations of Embodiment 1 of the present invention at the wide-angle end thereof, and Y indicates an image height. FIG. 2A shows longitudinal aberrations, FIG. 2B shows lateral aberrations on an axis and at an image height of 11.34 mm in a reference state, FIG. 2C shows lateral aberrations on the axis and at the image height of 11.34 mm in a state in which an inclination of a deflection angle of 0.3° has been corrected, and FIG. 2D shows lateral aberrations on the axis and at an image height of 11.34 mm in a state in which the inclination of a deflection angle of −0.3° has been corrected.

Figure 3B:
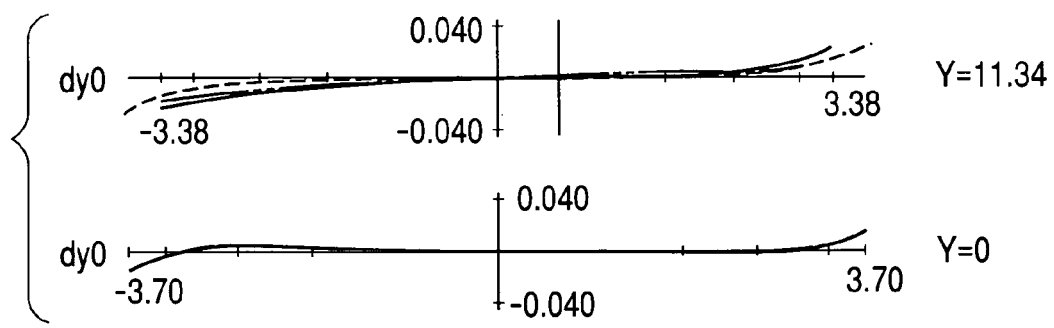
Figure 3C:
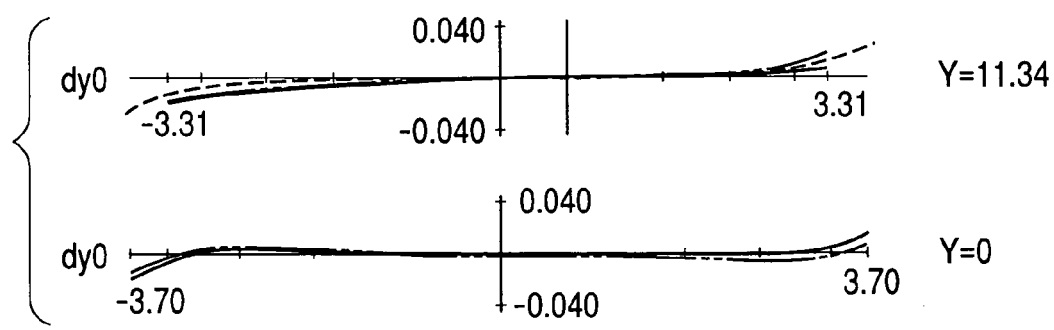
Figure 3D:
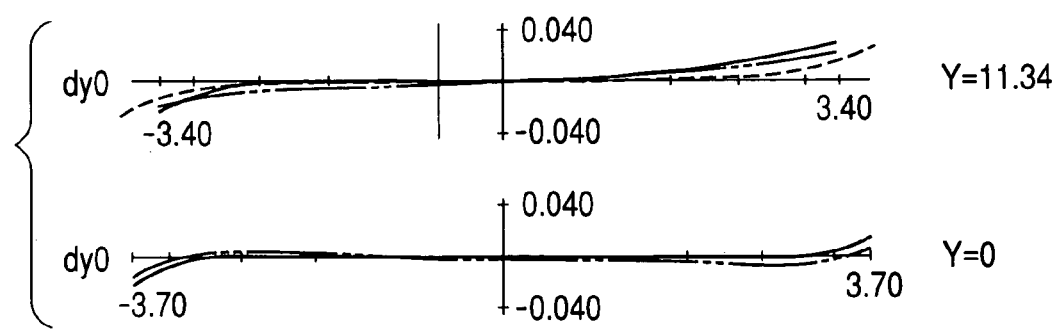

FIGS. 3A–3D show the aberrations of the zoom lens according to Embodiment 1 at the intermediate zoom position thereof. FIG. 3A shows longitudinal aberrations, FIG. 3B shows lateral aberrations on the axis and at the image height of 11.34 mm in the reference state, FIG. 3C shows lateral aberrations on the axis and at the image height of 11.34 mm in a state in which the inclination of a deflection angle 0.3° has been corrected, and FIG. 3D shows lateral aberrations on the axis and at the image height of 11.34 in a state in which the inclination of a deflection angle of −0.3° has been corrected.

Figure 4A:
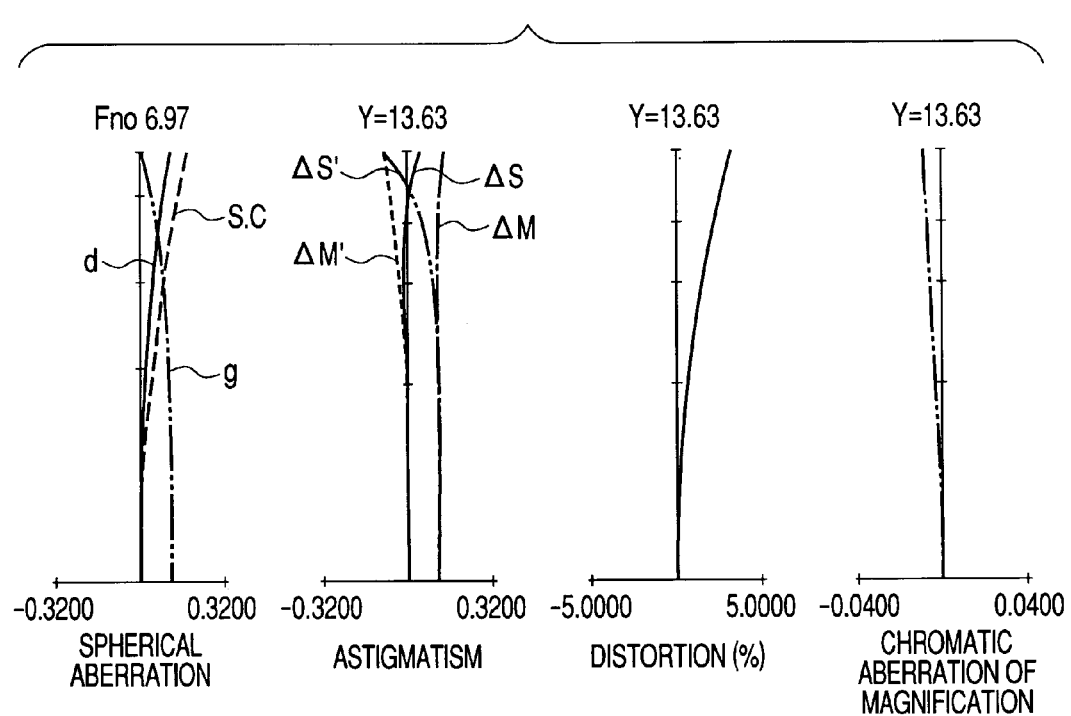
FIGS. 4A, 4B, 4C and 4D show the aberrations of the zoom lens according to Embodiment 1 at the telephoto end thereof.
Figure 4B:
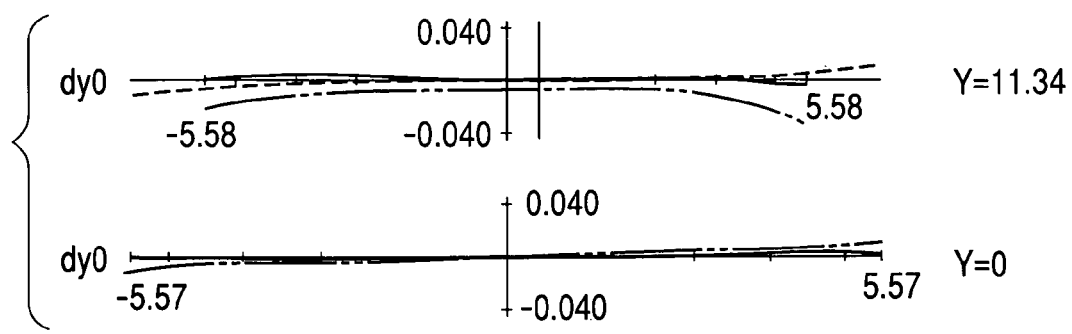
Figure 4C:
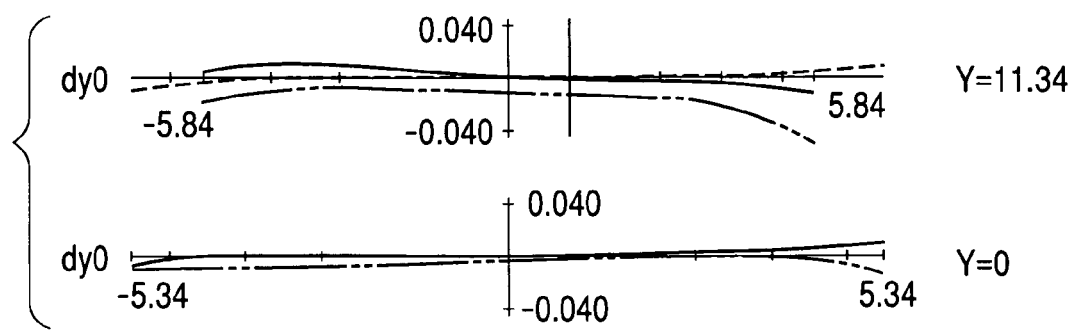
Figure 4D:
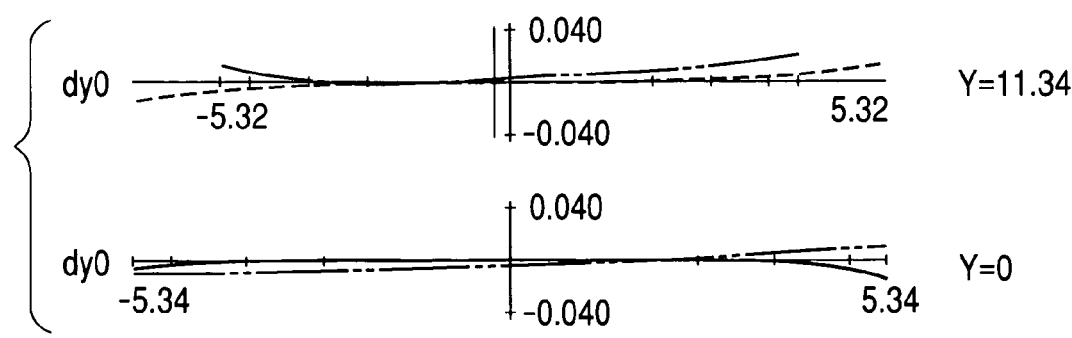

FIGS. 4A–4D show the aberrations of the zoom lens according to Embodiment 1 at the telephoto end (long focal length end) thereof. FIG. 4A shows longitudinal aberrations, FIG. 4B shows lateral aberrations on the axis and at the image height of 11.34 mm in the reference state, FIG. 4C shows lateral aberrations on the axis and at the image height of 11.34 mm in a state in which the inclination of a deflection angle of 0.3° has been corrected, and FIG. 4D shows lateral aberrations on the axis and at the image height of 11.34 mm in a state in which the inclination of a deflection angle of −0.3° has been corrected.

FIG. 5 is a lens cross-sectional view of a zoom lens according to Embodiment 2 at the wide-angle end thereof.

Figure 6B:
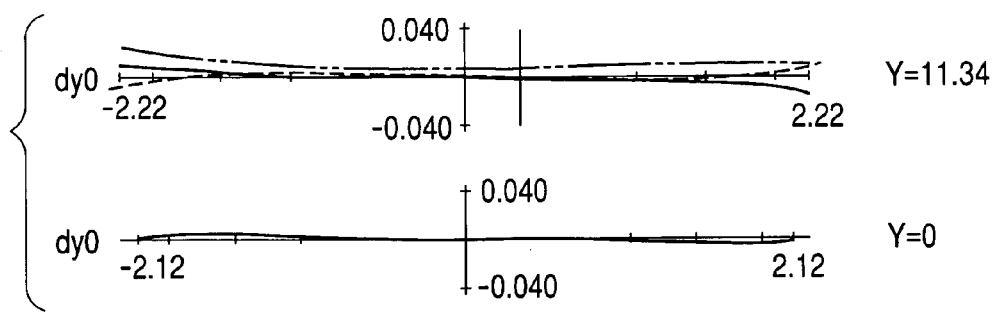
Figure 6C:
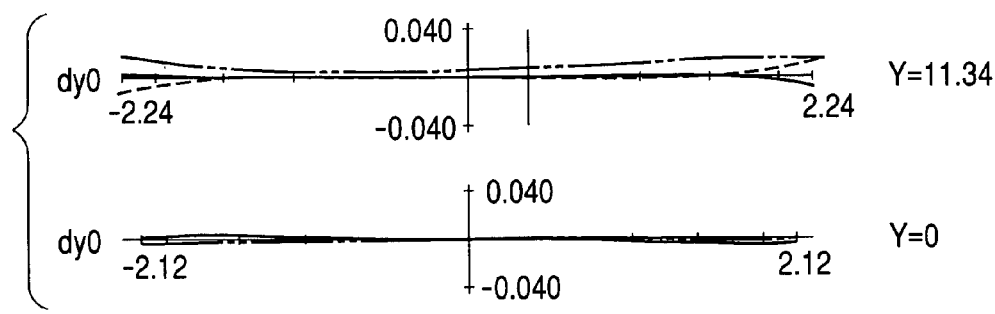
Figure 6D:
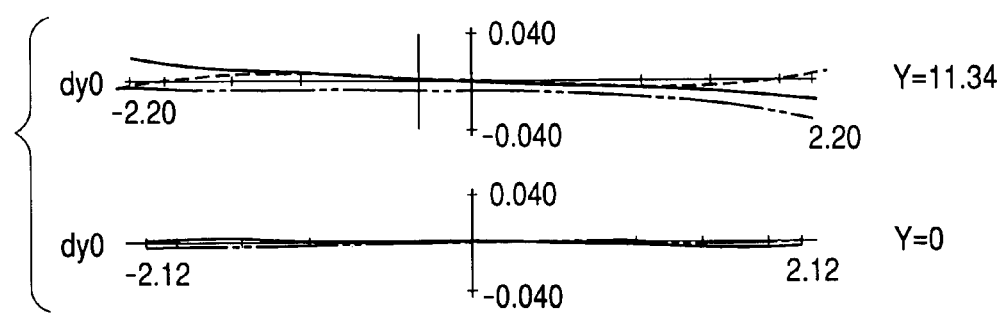

FIGS. 6A–6D show the aberrations of the zoom lens according to Embodiment 2 at the wide-angle end thereof. FIG. 6A shows longitudinal aberrations, FIG. 6B shows lateral aberrations on the axis and at the image height of 11.34 mm in the reference state, FIG. 6C shows lateral aberrations on the axis and at the image height of 11.34 mm in the state in which the inclination of a deflection angle of 0.3° has been corrected, and FIG. 6D shows lateral aberrations on the axis and at the image height of 11.34 mm in the state in which the inclination of a deflection angle of −0.3° has been corrected.

Figure 7A:
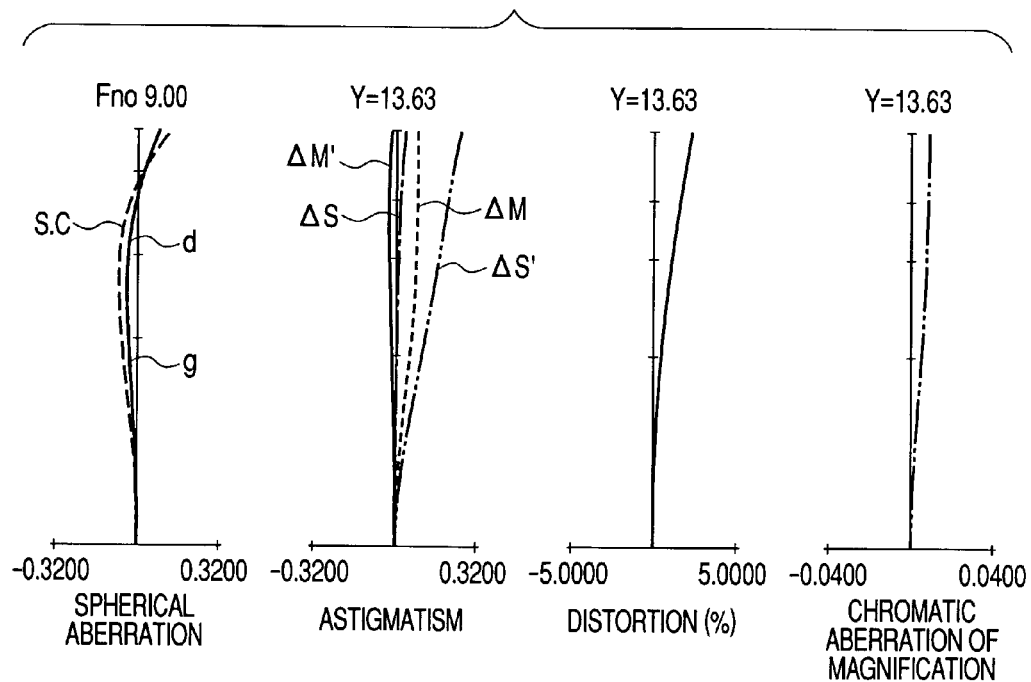
FIGS. 7A, 7B, 7C and 7D show the aberrations of the zoom lens according to Embodiment 2 at the intermediate zoom position thereof.
Figure 7B:
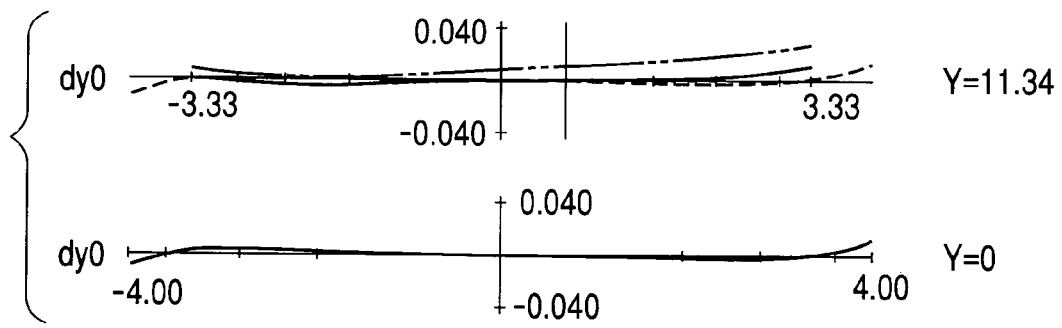
Figure 7C:
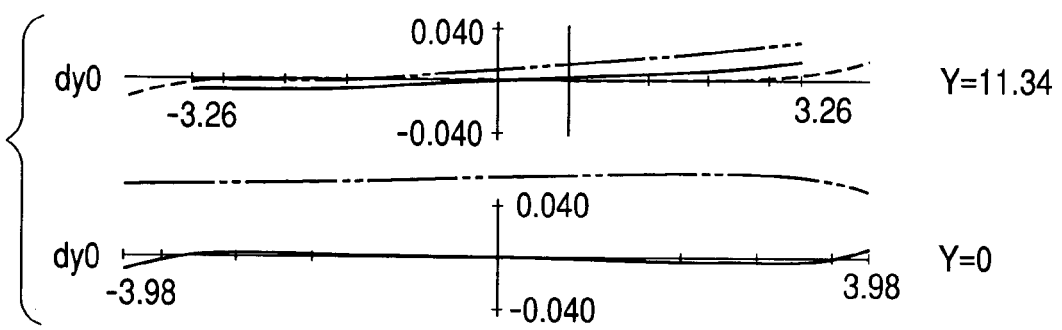
Figure 7D:
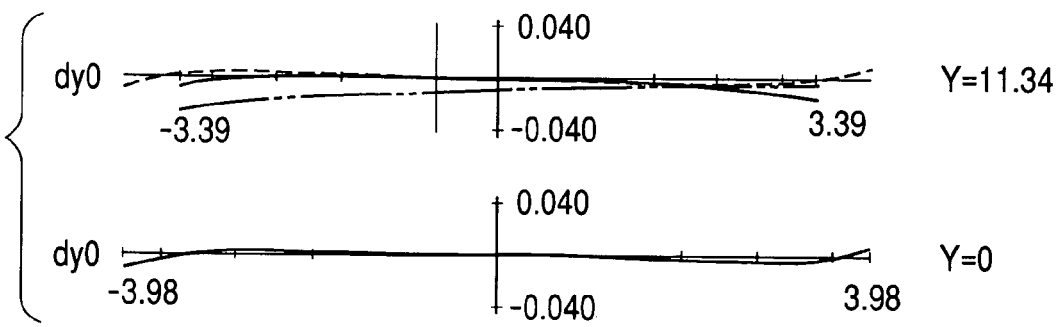

FIGS. 7A–7D show the aberrations of the zoom lens according to Embodiment 2 at the intermediate zoom position thereof. FIG. 7A shows longitudinal aberrations, FIG. 7B shows lateral aberrations on the axis and at the image height of 11.34 mm in the reference state, FIG. 7C shows lateral aberrations on the axis and at the image height of 11.34 mm in the state in which the inclination of a deflection angle of 0.3° has been corrected, and FIG. 7D shows lateral aberrations on the axis and at the image height of 11.34 mm in the state in which the inclination of a deflection angle of −0.3° has been corrected.

Figure 8A:
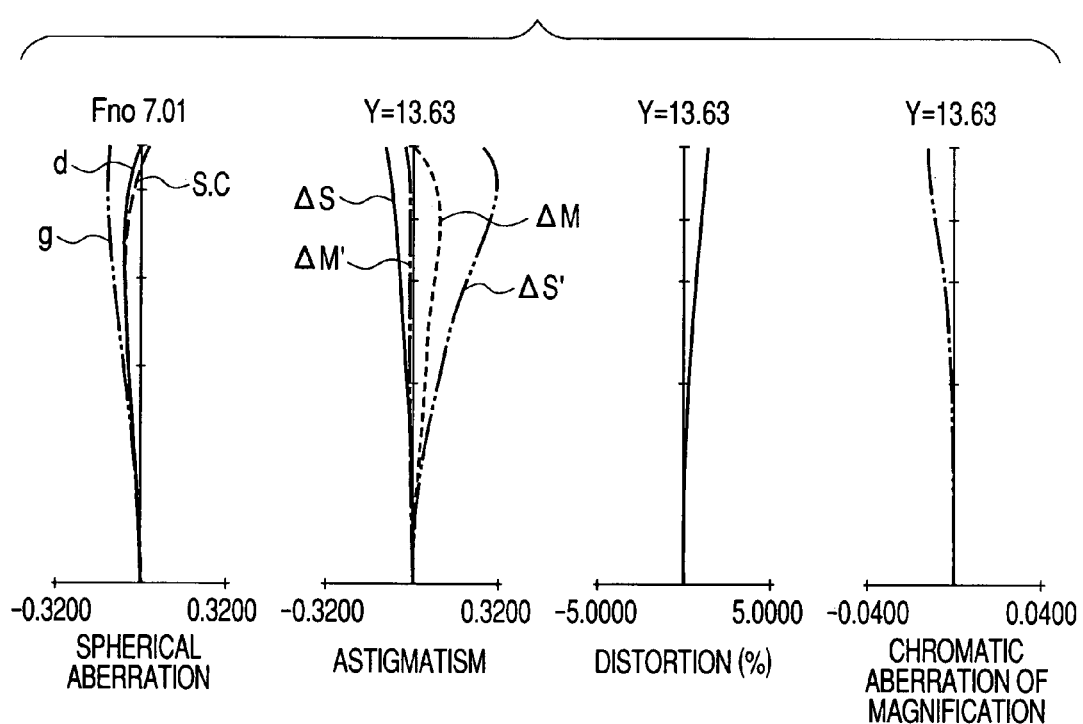
FIGS. 8A, 8B, 8C and 8D show the aberrations of the zoom lens according to claim 2 at the telephoto end thereof.
Figure 8B:
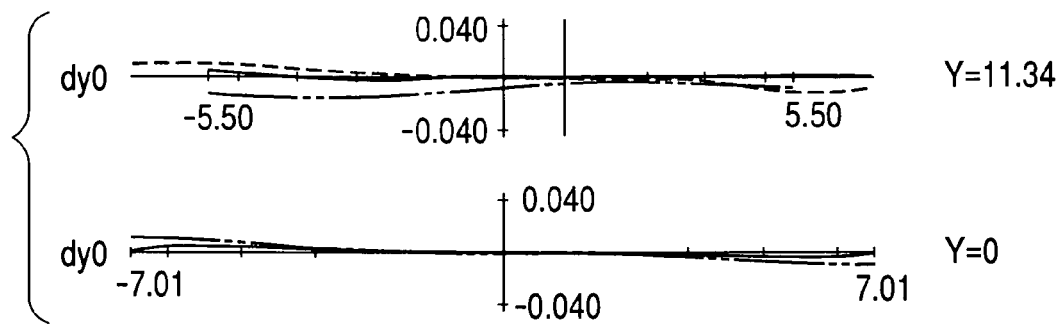
Figure 8C:
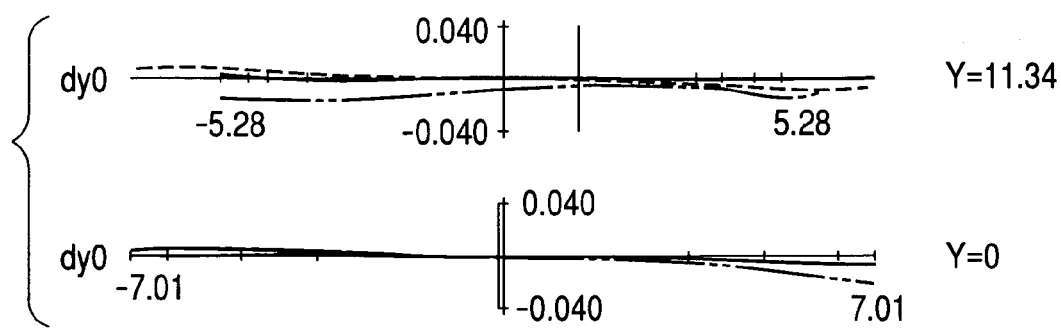
Figure 8D:
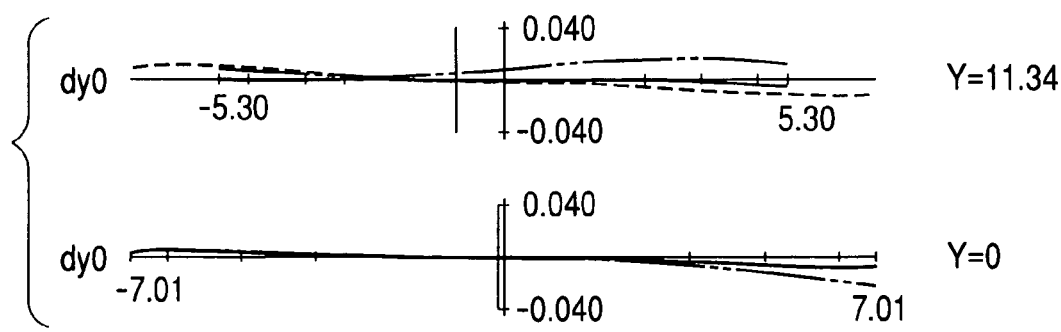

FIGS. 8A–8D show the aberrations of the zoom lens according to Embodiment 2 at the telephoto end thereof. FIG. 8A shows longitudinal aberrations, FIG. 8B shows lateral aberrations on the axis and at the image height of 11.34 mm in the reference state, FIG. 8C shows lateral aberrations on the axis and at the image height of 11.34 mm in the state in which the inclination of a deflection angle of 0.3° has been corrected, and FIG. 8D shows lateral aberrations on the axis and at the image height of 11.34 mm in the state in which the inclination of a deflection angle of −0.3° has been corrected.

FIG. 9 is a lens cross-sectional view of a zoom lens according to Embodiment 3 at the wide-angle end thereof.

Figure 10B:
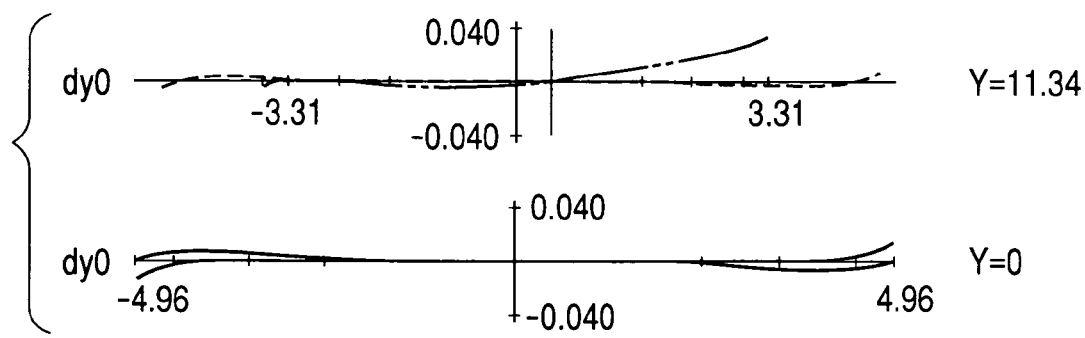
Figure 10C:
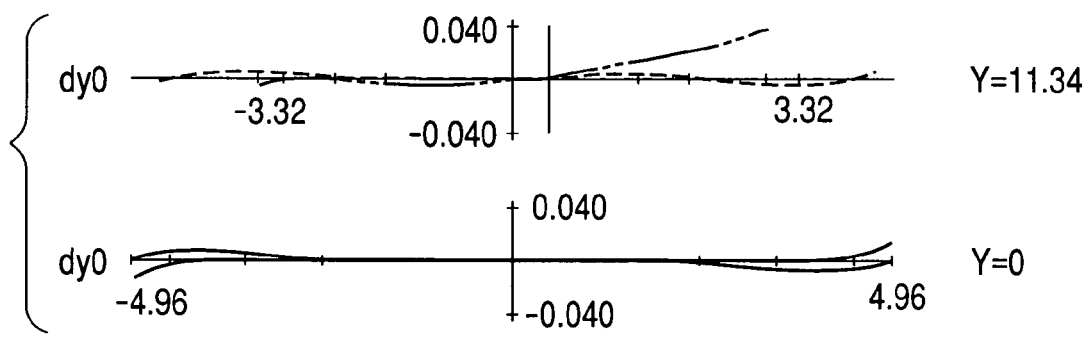
Figure 10D:
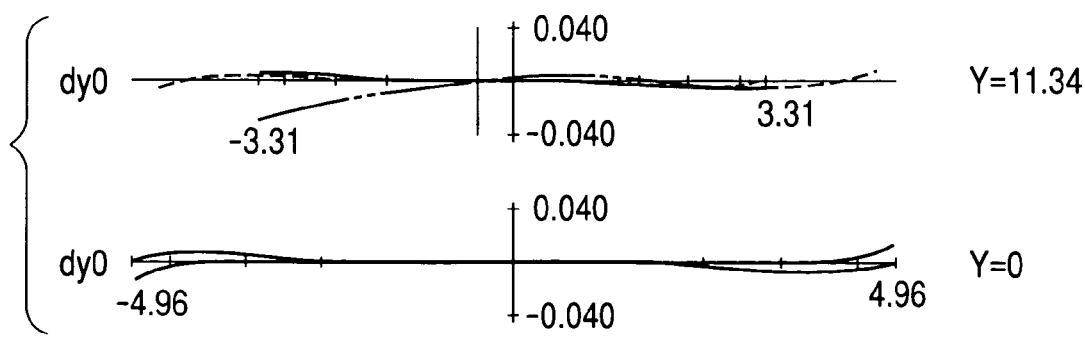

FIGS. 10A–10D show the aberrations of the zoom lens according to Embodiment 3 at the wide-angle end thereof. FIG. 10A shows longitudinal aberrations, FIG. 10B shows lateral aberrations on the axis and at the image height of 11.34 mm in the reference state, FIG. 10C shows lateral aberrations on the axis and at the image height of 11.34 mm in the state in which the inclination of a deflection angle of 0.3° has been corrected, and FIG. 10D shows lateral aberrations on the axis and at the image height of 11.34 mm in the state in which the inclination of a deflection angle of −0.3° has been corrected.

Figure 11B:
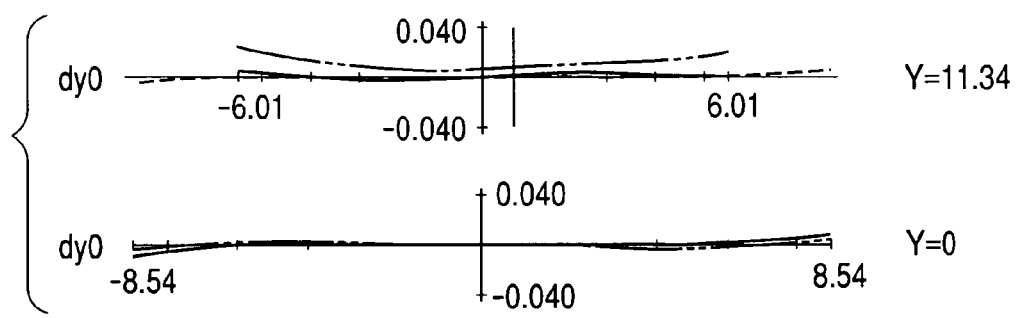
Figure 11C:
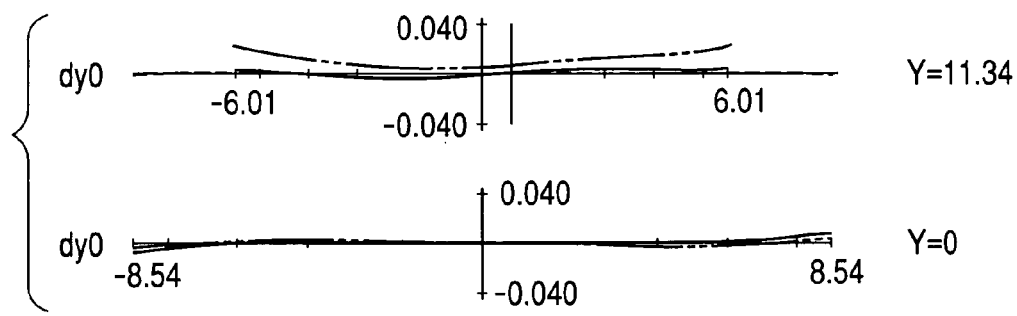
Figure 11D:
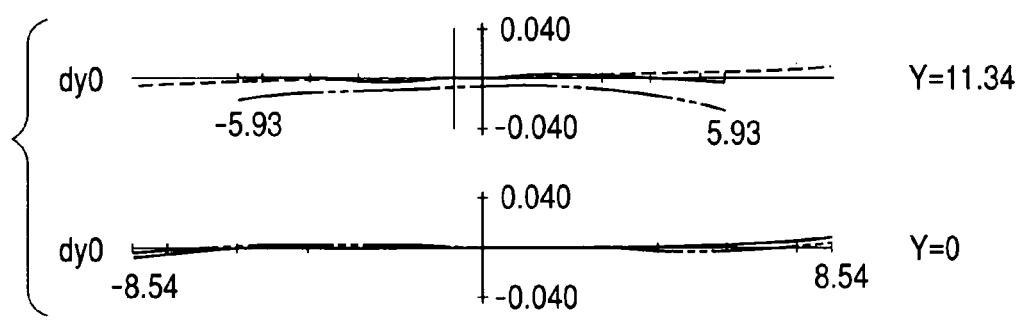

FIGS. 11A–11D show the aberrations of the zoom lens according to Embodiment 3 at the intermediate zoom position thereof. FIG. 11A shows longitudinal aberrations, FIG. 11B shows lateral aberrations on the axis and at the image height of 11.34 mm in the reference state, FIG. 11C shows lateral aberrations on the axis and at the image height of 11.34 mm in the state in which the inclination of a deflection angle of 0.3° has been corrected, and FIG. 11D shows lateral aberrations on the axis and at the image height of 11.34 mm in the state in which the inclination of a deflection angle of −0.3° has been corrected.

Figure 12A:
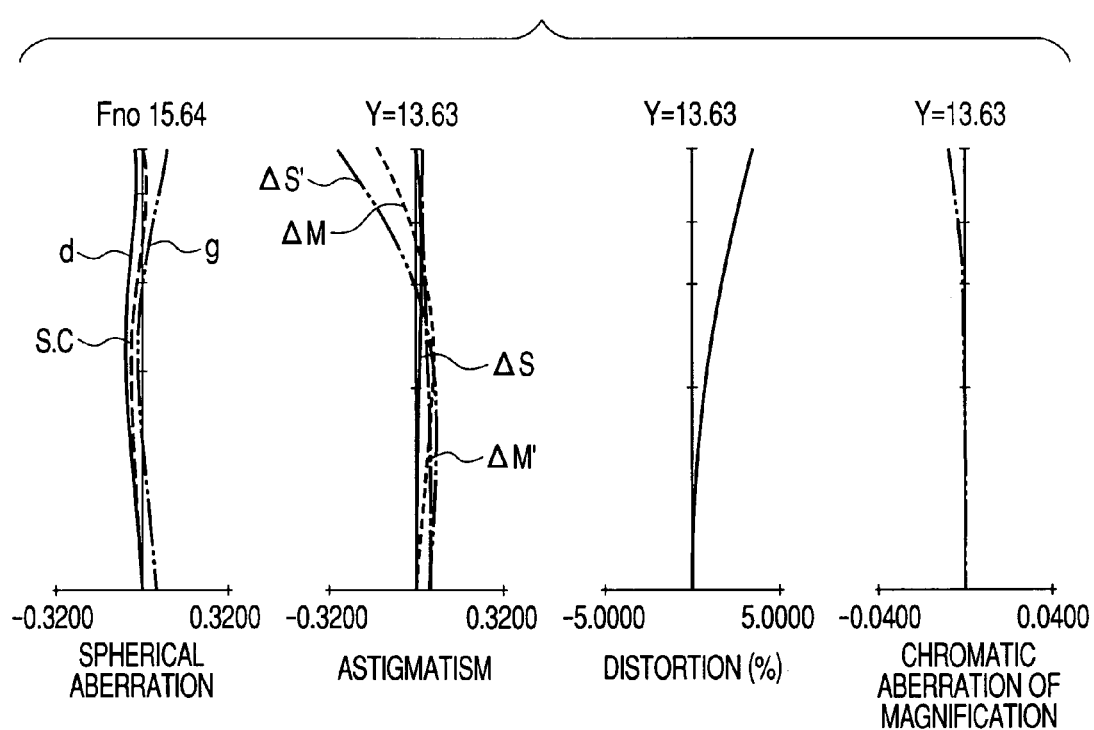
FIGS. 12A, 12B, 12C and 12D show the aberrations of the zoom lens according to Embodiment 3 at the telephoto end thereof.
Figure 12B:
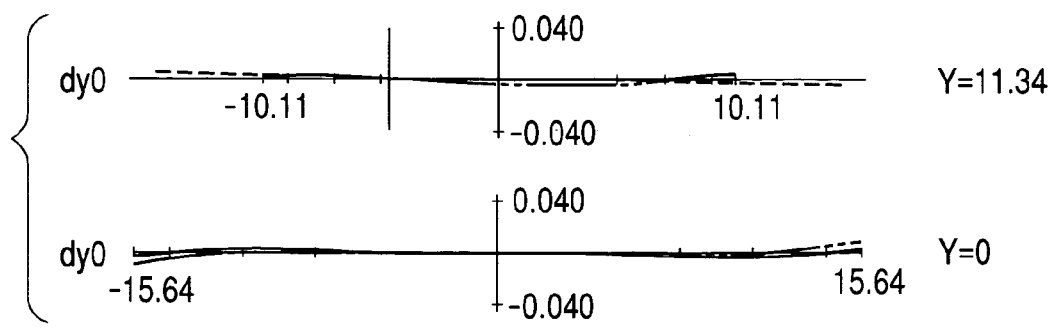
Figure 12C:
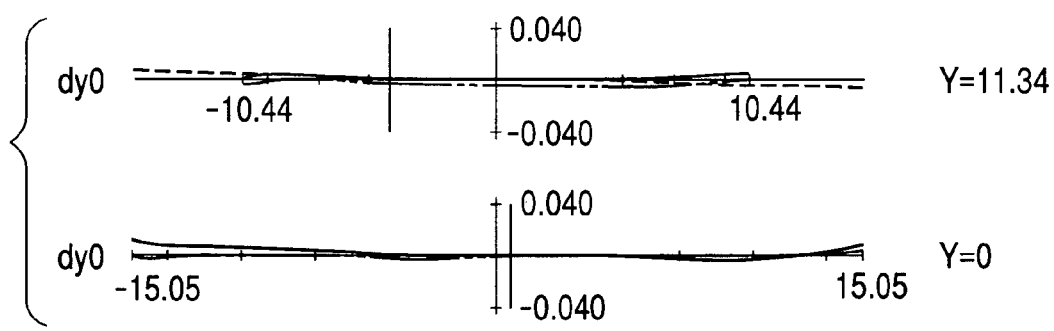
Figure 12D:
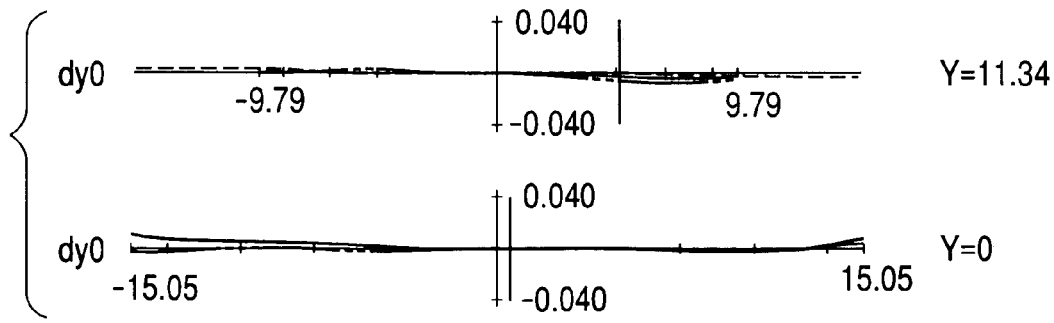

FIGS. 12A–12D show the aberrations of the zoom lens according to Embodiment 3 at the telephoto end thereof. FIG. 12A shows longitudinal aberrations, FIG. 12B shows lateral aberrations on the axis and at the image height of 11.34 mm in the reference state, FIG. 12C shows lateral aberrations on the axis and at the image height of 11.34 mm in the state in which the inclination of a deflection angle of 0.3° has been corrected, and FIG. 12D shows lateral aberrations on the axis and at the image height of 11.34 mm in the state in which the inclination of a deflection angle of −0.3° has been corrected.

Figure 13:
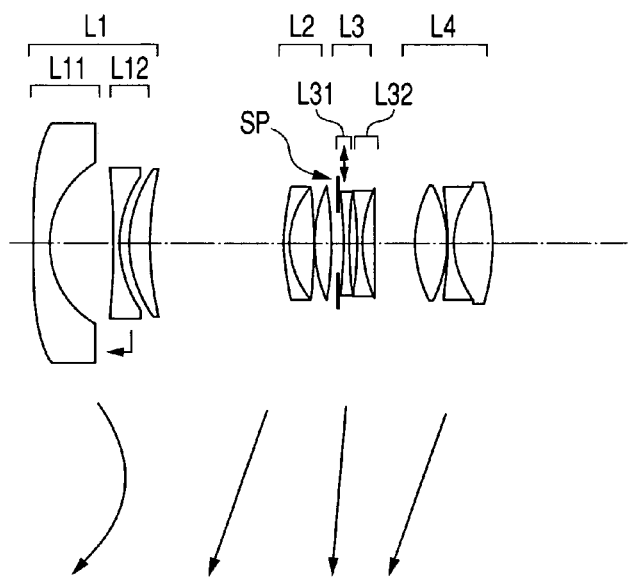
FIG. 13 is a lens cross-sectional view of a zoom lens according to Embodiment 4.

FIG. 13 is a lens cross-sectional view of a zoom lens according to Embodiment 4 at the wide-angle end thereof.

Figure 14A:
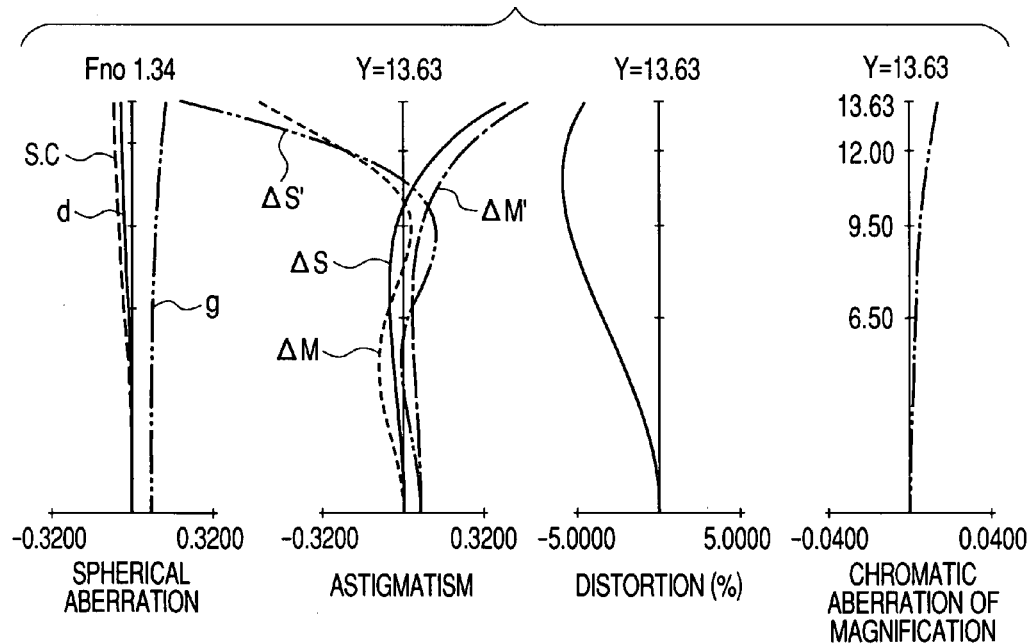
FIGS. 14A, 14B, 14C and 14D show the aberrations of the zoom lens according to Embodiment 4 at the wide-angle end thereof.
Figure 14B:
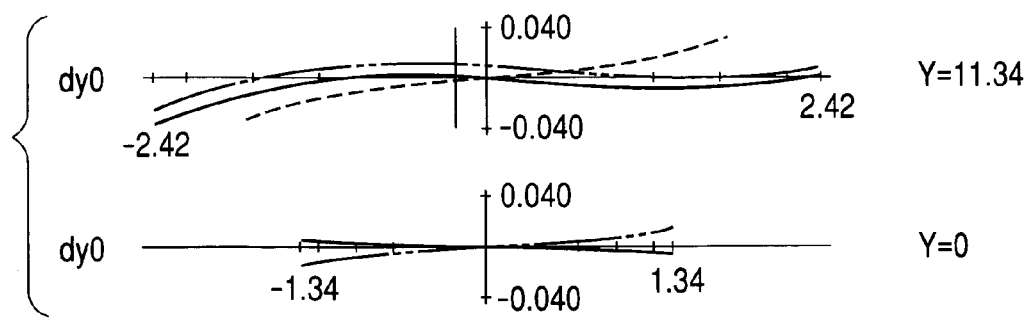
Figure 14C:
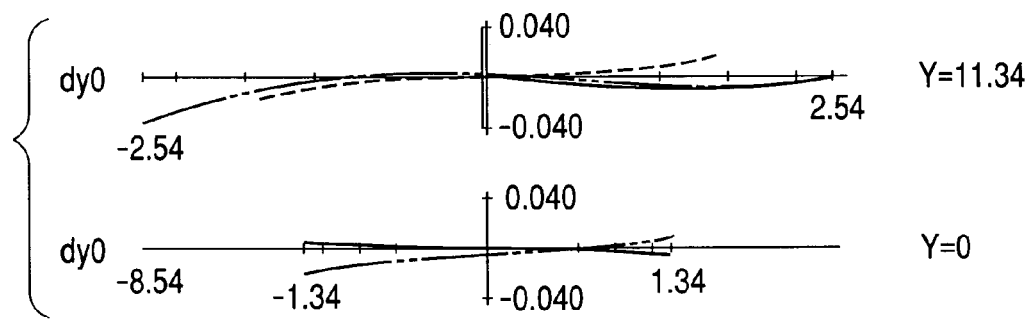
Figure 14D:
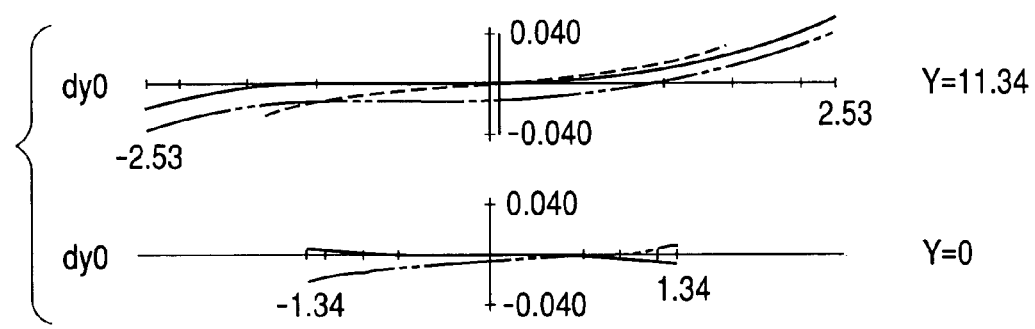

FIGS. 14A–14D show the aberrations of the zoom lens according to Embodiment 4 at the wide-angle end thereof. FIG. 14A shows longitudinal aberrations, FIG. 14B shows lateral aberrations on the axis and at the image height of 11.34 mm in the reference state, FIG. 14C shows lateral aberrations on the axis and at the image height of 11.34 mm in the state in which the inclination of a deflection angle of 0.3° has been corrected, and FIG. 14D shows lateral aberrations on the axis and at the image height of 11.34 mm in the state in which the inclination of a deflection angle of −0.3° has been corrected.

Figure 15A:
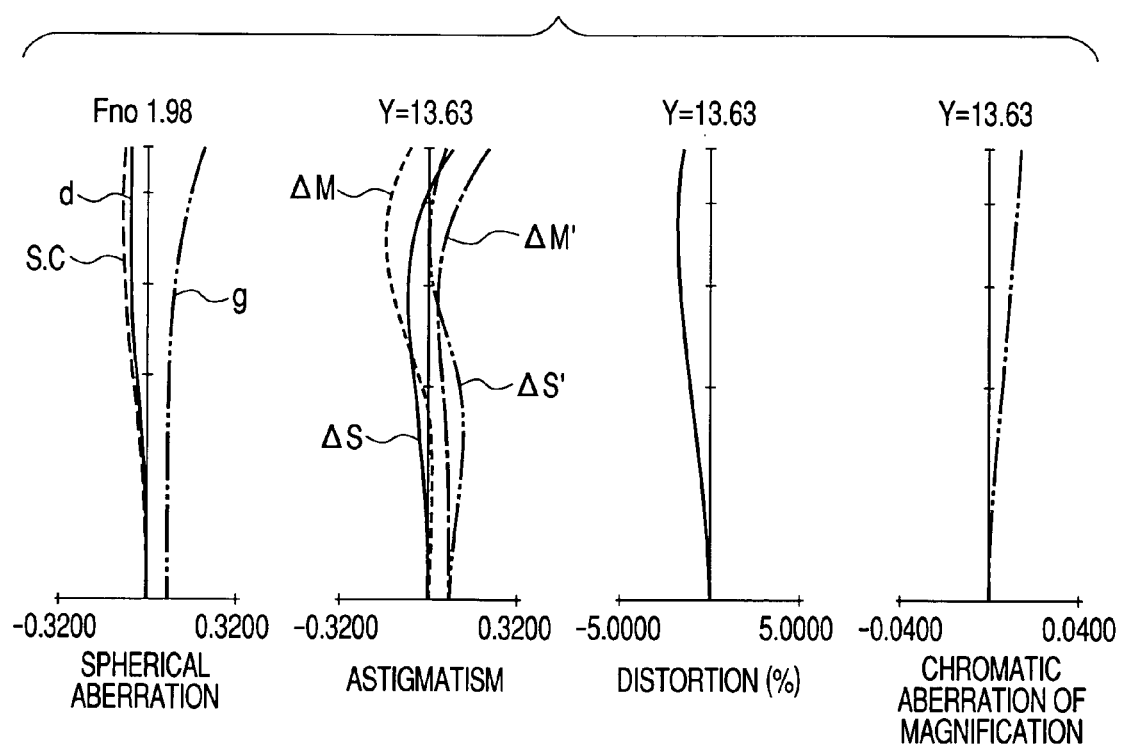
FIGS. 15A, 15B, 15C and 15D show the aberrations of the zoom lens according to Embodiment 4 at the intermediate zoom position thereof.
Figure 15B:
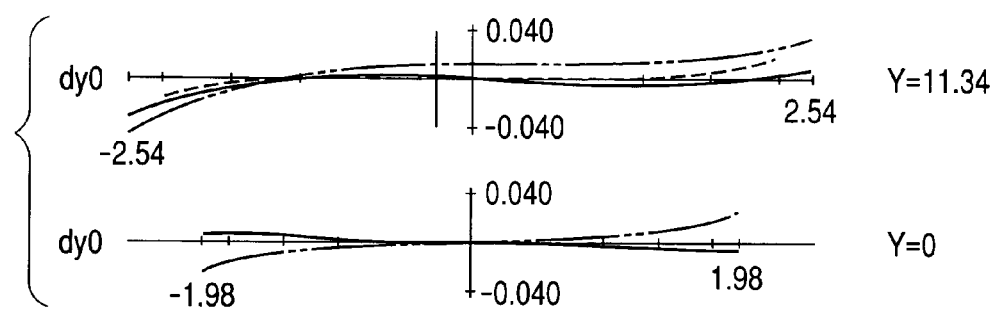
Figure 15C:
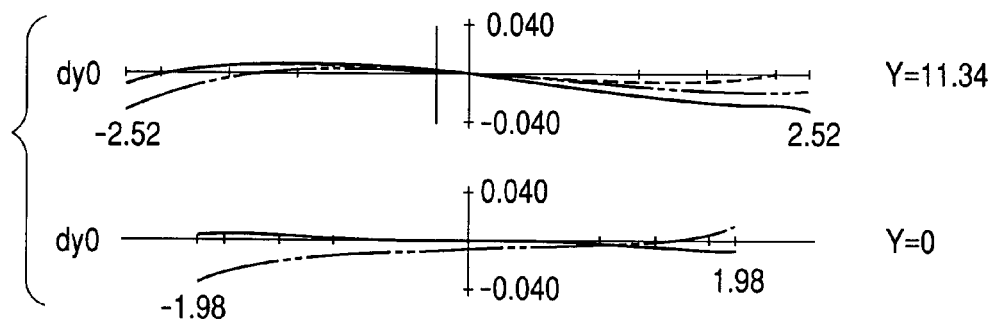
Figure 15D:
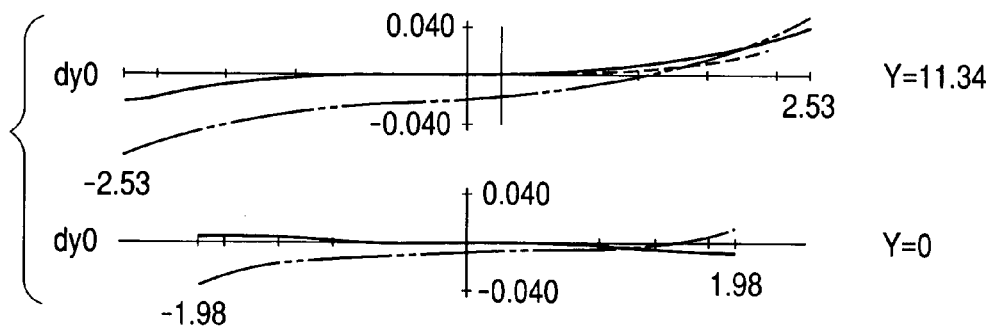

FIGS. 15A–15D show the aberrations of the zoom lens according to Embodiment 4 at the intermediate zoom position thereof. FIG. 15A shows longitudinal aberrations, FIG. 15B shows lateral aberrations on the axis and at the image height of 11.34 mm in the reference state, FIG. 15C shows lateral aberrations on the axis and at the image height of 11.34 mm in the state in which the inclination of a deflection angle of 0.3° has been corrected, and FIG. 15D shows lateral aberrations on the axis and at the image height of 11.34 mm in the state in which the inclination of a deflection angle of −0.3° has been corrected.

Figure 16A:
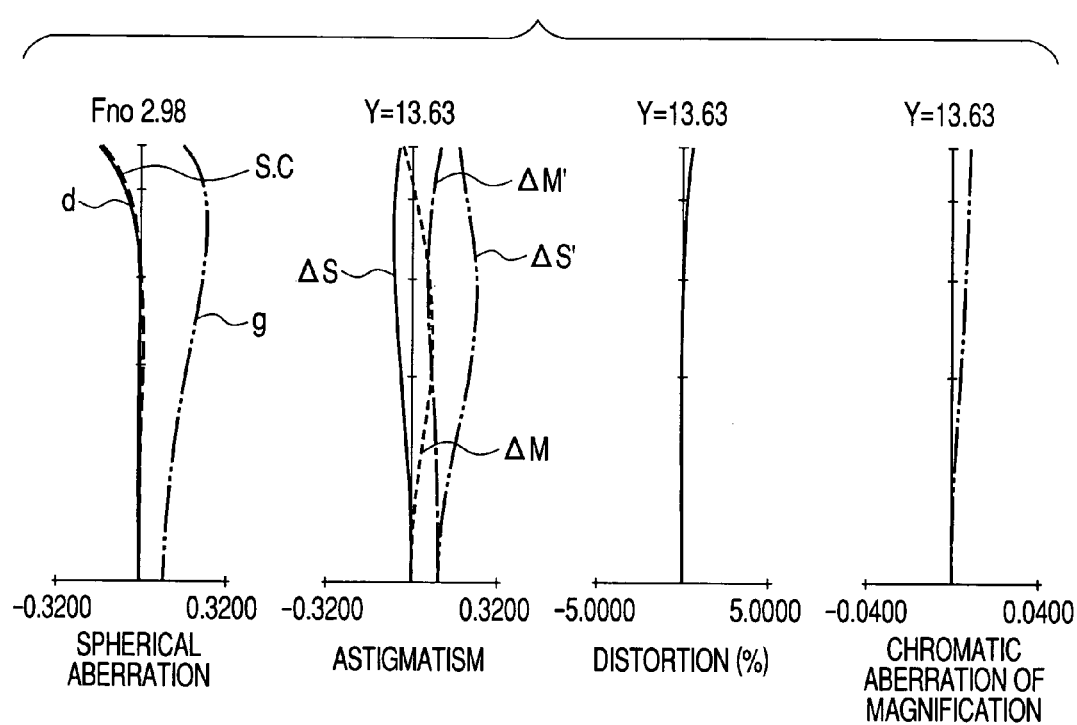
FIGS. 16A, 16B, 16C and 16D show the aberrations of the zoom lens according to Embodiment 4 at the telephoto end thereof.
Figure 16B:
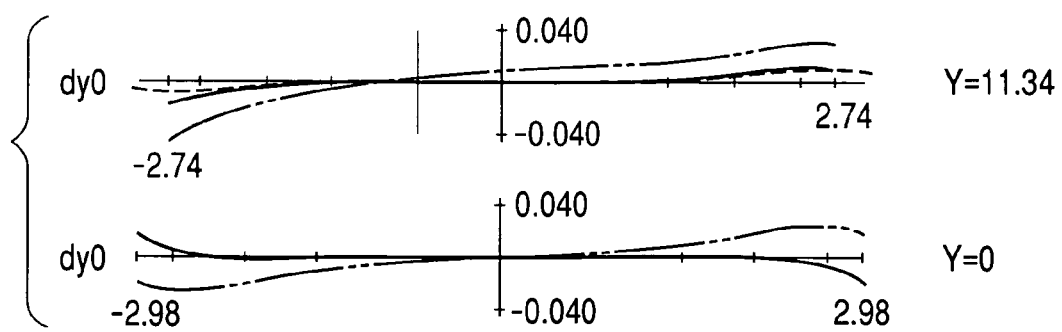
Figure 16C:
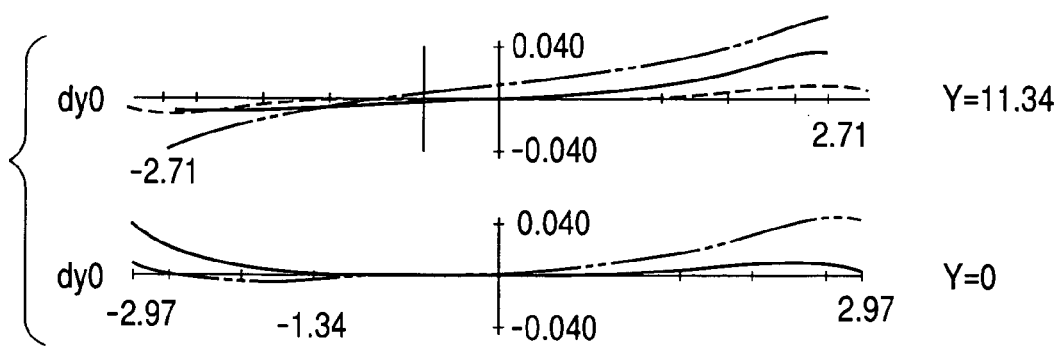
Figure 16D:
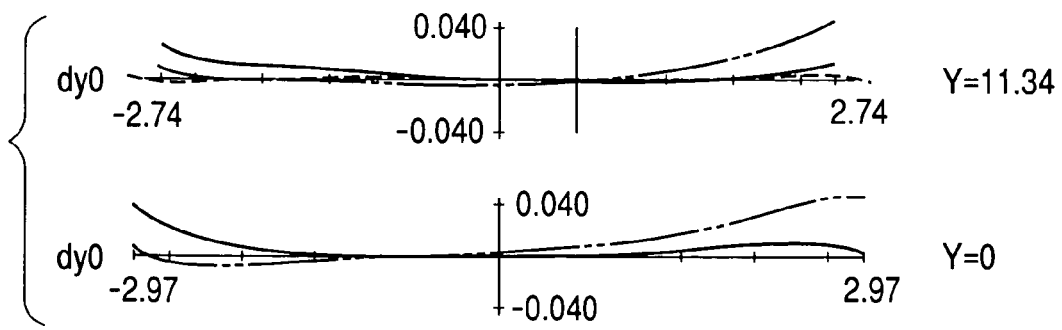

FIGS. 16A–16D show the aberrations of the zoom lens according to Embodiment 4 at the telephoto end thereof. FIG. 16A shows longitudinal aberrations, FIG. 16B shows lateral aberrations on the axis and at the image height of 11.34 mm in the reference state, FIG. 16C shows lateral aberrations on the axis and at the image height of 11.34 mm in the state in which the inclination of a deflection angle of 0.3° has been corrected, and FIG. 16D shows lateral aberrations on the axis and at the image height of 11.34 mm in the state in which the inclination of a deflection angle of −0.3° has been corrected.

Figure 17:
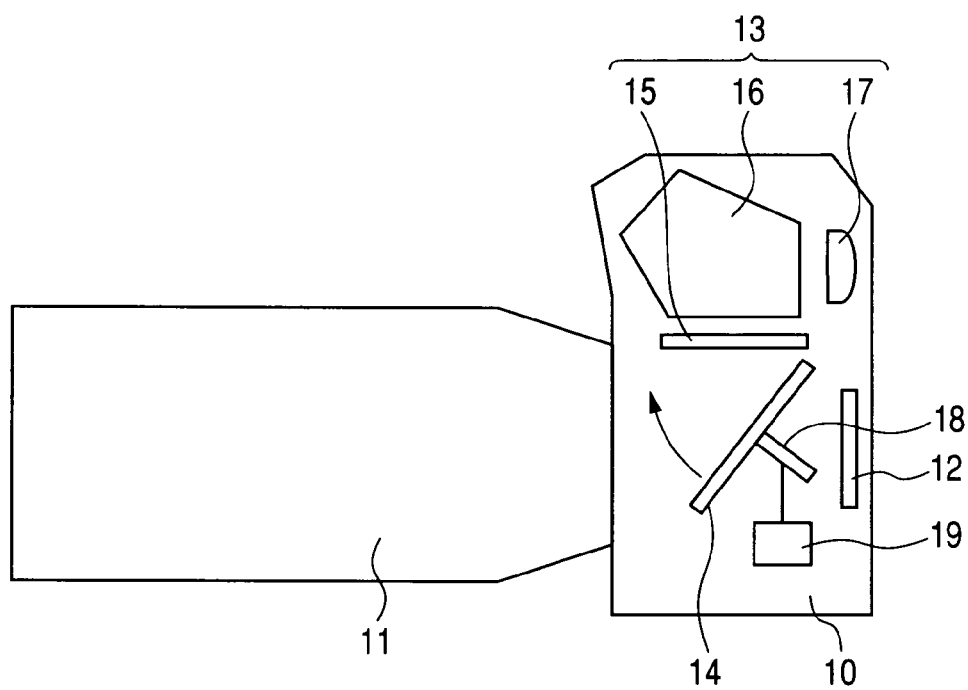
FIG. 17 is a schematic view of the essential portions of the image pickup apparatus of the present invention.
Figure 18:
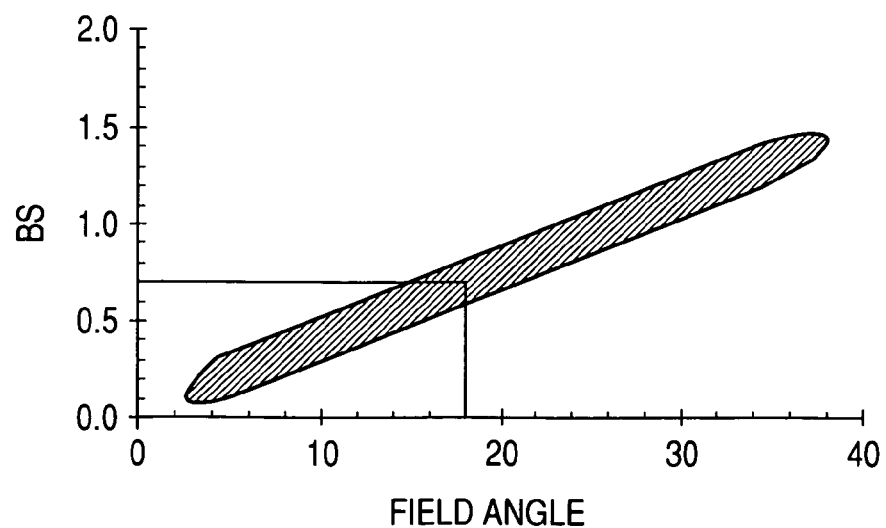
FIG. 18 is an illustration showing the relation between shake correction sensitivity and a field angle characteristic.

FIG. 17 is a schematic view of the essential portions of a single-lens reflex camera (image pickup apparatus) provided with the zoom lens system of the present invention.

In each lens cross-sectional view, the left is the object side (front) and the right is the image side (rear).

The zoom lens according to each embodiment is a photo-taking lens system used in the image pickup apparatus. In each lens cross-sectional view, Li designates the i-th lens unit, and SP denotes an aperture stop.

IP designates an image plane, which correspond to the image pickup surface of a solid-state image pickup device (photoelectric transducer) such as a CCD sensor or a CMOS sensor when the zoom lens is used as the photo-taking optical system of a video camera or a digital still camera, and to a photosensitive surface such as a film surface when the zoom lens is used as the photo-taking optical system of a silver-halide film camera.

In the aberration graphs, d and g represent d-line and g-line, respectively, S.C represents a sine condition, ΔM and ΔS represent a meridional image plane and a sagittal image plane, respectively, and the chromatic aberration of magnification is represented for g-line.

ΔS' and ΔM' represent the sagittal image plane and meridional image plane, respectively, for the g-line.

$f_{no}$ represents F number, and Y represents the image height.

Arrows in each lens cross-sectional view indicate the movement loci of the respective lens units during zooming from the wide-angle end to the telephoto end.

The Embodiments 1, 2 and 3 shown in the respective FIGS. 1, 5 and 9, are zoom lenses of a so-called positive lead type in which a lens unit having positive refractive power is disposed on the most object side. The Embodiment 4 shown in FIG. 13 is a zoom lens of a so-called negative lead type in which a lens unit having negative refractive power is disposed on the most object side.

Each of the zoom lenses according to Embodiments 1, 2 and 4 has an aperture stop SP, and two lens components having negative refractive power, i.e. a lens subunit A1 and a lens subunit A2, disposed on the image side of the aperture stop SP. The lens subunit A1 is moved so as to have a component in a direction perpendicular to the optical axis thereof to thereby displace the imaging position of the entire zoom lens system in the direction perpendicular to the optical axis. Thereby, the correction of the blur (the image stabilizing) of an image attributable to a hand shake or the like is effected.

In the Embodiments 1, 2 and 4 shown in the respective FIGS. 1, 5 and 13, a lens unit including the lens subunit A1 and the lens subunit A2 is moved during zooming.

In the Embodiment 3 shown in FIG. 9, the lens unit including the lens subunit A1 and the lens subunit A2 is located on the object side with respect to the aperture stop SP, and is stationary during zooming.

The lens subunit A1 is moved so as to have a component in the direction perpendicular to the optical axis to thereby displace the imaging position of the entire zoom lens system in the direction perpendicular to the optical axis.

As described above, each embodiment has a plurality of lens units as a whole in which the lens subunit A1 having negative refractive power and the lens subunit A2 having negative refractive power are disposed adjacent to each other.

The lens subunit A1 is moved so as to have a component in the direction perpendicular to the optical axis to thereby displace the imaging position formed by the entire system in the direction perpendicular to the optical axis.

In each embodiment, letting TS be the displacement amount of the imaging position of the entire zoom lens system in the direction perpendicular to the optical axis when the lens subunit A1 has been moved by a unit amount in the direction perpendicular to the optical axis at the telephoto end, the condition that $$0.25 < TS < 1.25 \quad (1)$$

is satisfied.

In each embodiment, eccentricity sensitivity is set so as to satisfy the conditional expression (1), whereby shake correction can be effected effectively and the manufacture of the entire lens can be easily made.

In each embodiment, more preferably, the numerical value range of the conditional expression (1) may be set as follows:

$$0.45 < TS < 1.2 \quad (1a)$$

Each embodiment uses the lens unit (lens component) having negative refractive power as a image stabilizing lens unit. Thereby, as compared with a case where a lens unit having positive refractive power is used as a image stabilizing lens unit, the outer diameter of the lens becomes small, thus achieving the downsizing of the image stabilizing unit.

In the Embodiments 1, 2 and 4 shown in the respective FIGS. 1, 5 and 13, the movable lens unit having negative refractive power moved during zooming is divided into the lens subunit A1 for shake correction and the lens subunit A2, whereby it is made possible to obtain a sufficient focal length changing effect and yet, make the eccentricity sensitivity of the image stabilizing lens subunit A1 into a desired value.

The zoom lens according to each embodiment will now be described in greater detail.

[Embodiment 1]

In FIG. 1, L1 designates a first lens unit having positive refractive power, L2 denotes a second lens unit having negative refractive power, L3 designates a third lens unit having positive refractive power, L4 denotes a fourth lens unit having positive refractive power, L5 designates a fifth lens unit having negative refractive power, and L6 denotes a sixth lens unit having positive refractive power.

SP designates an aperture stop, and in the present embodiment, the aperture stop SP is moved integrally with the third lens unit L3 during zooming.

The fifth lens unit L5 is constituted by a lens subunit L1 composed of two lenses and having negative refractive power, and a lens subunit L52 composed of a lens and having negative refractive power. The lens subunit L51 nearer to the aperture stop SP is used as a image stabilizing lens unit, and is moved so as to have a component in a direction perpendicular to the optical axis thereof to thereby displace an image formed by the entire zoom lens system in the direction perpendicular to the optical axis.

An aspherical surface by a so-called replica method is formed on the first lens surface (surface R6) of the second lens unit L2 as counted from the object side.

The first lens of the sixth lens unit L6 as counted from the object side is a glass-molded aspherical lens of which the image side surface (surface R28) is of an aspherical shape.

The image circle (effective diameter) of the zoom lens according to the present embodiment is φ27.3 mm, which corresponds to APS size.

Letting TS be eccentricity sensitivity which is defined by the ratio |Δx/Δh| of the correction amount (the displacement amount of the imaging position of the entire system in the direction perpendicular to the optical axis) Δx of the blur of the image to the unit movement amount Δh of the lens subunit L51 to the component in the direction perpendicular to the optical axis, the eccentricity sensitivity TS of the lens subunit L51 at the telephoto end, as shown in Table 1, is $$TS=1.01.$$

[Embodiment 2]

In FIG. 5, L1 designates a first lens unit having positive refractive power, L2 denotes a second lens unit having negative refractive power, L3 designates a third lens unit having positive refractive power, L4 denotes a fourth lens unit having negative refractive power, and L5 designates a fifth lens unit having positive refractive power.

SP denotes an aperture stop, and in the present embodiment, the aperture stop SP is moved integrally with the third lens unit L3 during zooming.

The fourth lens unit L4 is constituted by a lens subunit L41 composed of two lenses and having negative refractive power, and a lens subunit L42 having negative refractive power. The lens subunit L41 which is nearer to the aperture stop SP is used as a image stabilizing lens unit, and is moved so as to have a component in a direction perpendicular to the optical axis thereof to thereby displace an image formed by the entire zoom lens system in the direction perpendicular to the optical axis.

An aspherical surface by the replica method is formed on the first lens surface (surface R6) of the second lens unit L2 as counted from the object side.

The first lens of the fifth lens unit L5 as counted from the object side is a glass-molded aspherical lens, of which the image side surface (surface R28) is of an aspherical shape.

The image circle (effective diameter) of the zoom lens according to the present embodiment is φ27.3 mm, which corresponds to APS size.

Letting TS be eccentricity sensitivity which is defined by the ratio |Δx/Δh| of the correction amount (the displacement amount of the imaging position of the entire system in the direction perpendicular to the optical axis) Δx of the blur of the image to the unit movement amount Δh of the lens subunit L51 to the component in the direction perpendicular to the optical axis, the eccentricity sensitivity TS of the lens subunit L41 at the telephoto end, as shown in Table 1, is $$TS=1.01.$$

[Embodiment 3]

In FIG. 9, L1 designates a first lens unit having positive refractive power, L2 denotes a second lens unit having negative refractive power, L3 designates a third lens unit having positive refractive power, L4 denotes a fourth lens unit having negative refractive power, L5 designates a fifth lens unit having positive refractive power, L6 denotes a sixth lens unit having negative refractive power, and L7 designates a seventh lens unit having positive refractive power.

SP denotes an aperture stop, and in the present embodiment, the aperture stop SP is moved integrally with the third lens unit L3 during zooming.

The second lens unit L2 is constituted by a lens subunit L21 composed of a lens and having negative refractive power, and a lens subunit L22 composed of three lenses and having negative refractive power. The lens subunit L22 which is nearer to the aperture stop SP is used as a image stabilizing lens unit, and is moved so as to have a component in a direction perpendicular to the optical axis thereof to thereby move an image formed by the entire zoom lens system in the direction perpendicular to the optical axis.

The image side lens of the third lens unit L3 and the object side lens of the fifth lens unit L5 are glass-molded aspherical lenses, of which the image side surfaces (surfaces R16 and R22) are of an aspherical shape.

A diffraction grating is formed between the second and third lenses (surface R4) of the first lens unit L1 as counted from the object side.

The image circle (effective diameter) of the zoom lens according to the present embodiment is ϕ27.3 mm, which corresponds to APS size.

Letting TS be eccentricity sensitivity which is defined by the ratio |Δx/Δh| of the correction amount (the displacement amount of the imaging position of the entire system in the direction perpendicular to the optical axis) Δx of the blur of the image to the unit movement amount Δh of the lens subunit L22 to the component in the direction perpendicular to the optical axis, the eccentricity sensitivity of the lens subunit L22 at the telephoto end, as shown in Table 1, is

TS=1.194.

[Embodiment 4]

In FIG. 13, L1 designates a first lens unit having negative refractive power, L2 denotes a second lens unit having positive refractive power, L3 designates a third lens unit having negative refractive power, and L4 denotes a fourth lens unit having positive refractive power.

SP designates an aperture stop, and in the present embodiment, the aperture stop SP is moved integrally with the third lens unit L3 during zooming.

The first lens unit L1 is constituted by a lens subunit L11 having negative refractive power and a lens subunit L12 having negative refractive power. The lens subunit L12 is moved to thereby effect focusing.

The third lens unit L3 is constituted by a lens subunit L31 comprised of a lens and having negative refractive power, and a lens subunit L32 composed of two lenses and having negative refractive power. The lens subunit L31 which is nearer to the aperture stop SP is used as a image stabilizing lens unit, and is moved so as to have a component in a direction perpendicular to the optical axis thereof to thereby move an image formed by the entire lens system in the direction perpendicular to the optical axis.

A diffraction grating is formed on the first lens surface of the lens subunit L12 as counted from the object side.

The image circle (effective diameter) of the zoom lens according to the present embodiment is ϕ27.3 mm, which corresponds to APS size.

Letting TS be eccentricity sensitivity which is defined by the ratio |Δx/Δh| of the correction amount (the displacement amount of the imaging position of the entire system in the direction perpendicular to the optical axis) Δx of the blur of the image to the unit movement amount of the lens subunit L31 in the direction perpendicular to the optical axis, the eccentricity sensitivity TS, the eccentricity sensitivity TS of the lens subunit L31, as shown in Table 1, is

TS=0.487.

In Embodiments 3 and 4, a single-layer or laminated diffraction optical element is provided in the lens system to thereby correct chromatic aberration.

Also, an aspherical surface effect is utilized to correct various aberrations.

To correct chromatic aberration by the use of a diffraction optical element is effected by a method similar to that disclosed, for example, in Japanese Patent Application Laid-open No. H11-052238 (corresponding to U.S. Pat. No. 6,606,200), Japanese Patent Application Laid-open No. H11-052244 (corresponding to U.S. Pat. No. 6,606,200), Japanese Patent Application Laid-open No. H11-305126 (corresponding to U.S. Pat. No. AA 200 3076591), Japanese Patent Application Laid-open No. H09-127322 (corresponding to U.S. Pat. No. 6,157,488), etc.

In each embodiment, in order to correct the blur of the image resulting from a hand shake or the like, the lens unit (image stabilizing lens unit) moved so as to have a component in the direction perpendicular to the optical axis to thereby displace the image is constructed as previously described, thereby securing high shake correction sensitivity and well effecting the correction of chromatic aberration of eccentricity magnification occurring during shake correction.

Also, an aspherical surface is disposed to thereby facilitate the correction of eccentricity coma occurring during shake correction. At this time, as the aspherical surface, use may be made of any one of a ground aspherical surface, a glass-molded aspherical surface, an aspherical surface formed of resin on the surface of an aspherical lens and a plastic-molded aspherical surface.

An embodiment of a single-lens reflex camera system using the zoom lens system of the present invention will now be described with reference to FIG. 17. In FIG. 17, the reference numeral 10 designates a single-lens reflex camera main body, and the reference numeral 11 denotes an interchangeable lens carrying thereon the zoom lens system according to the present invention. The reference numeral 12 designates a photosensitive surface, on which there is disposed a solid-state image pickup device (photoelectric transducer) such as a CCD sensor or a CMOS sensor, or silver-halide film. The reference numeral 13 denotes a finder optical system for observing therethrough an object image from the interchangeable lens 11, and the reference numeral 14 designates a pivotally movable quick return mirror for changing over and transmitting the object image from the interchangeable lens 11 to the photosensitive surface 12 and the finder optical system 13. When the object image is to be observed through the finder, the object image formed on a focusing plate 15 through the intermediary of the quick return mirror 14 is made into an erect image by a pentaprism 16, and thereafter is enlarged by and observed through an eyepiece optical system 17 During photographing, the quick return mirror 14 is pivotally moved in the direction of arrow and the object image is formed and recorded on the photosensitive surface 12. The reference numeral 18 designates a sub-mirror, and the reference numeral 19 denotes a focus detecting device.

By thus applying the zoom lens system of the present invention to an optical apparatus such as a single-lens reflex camera interchangeable lens, it is possible to realize an optical apparatus having high optical performance.

The present invention can likewise be applied to an SLR (single-lens reflex) camera having no quick return mirror.

Numerical Embodiments 1 to 4 corresponding to Embodiments 1 to 4 will be shown below. In each numerical value embodiment, i indicates the order of surfaces from the object side, and Ri indicates the radius of curvature of each surface, Di indicates the member thickness or air gap between the i-th surface and the (i+1)-th surface, and Ni and vi indicate the refractive index and Abbe number, respectively, with d-line as the reference. The aspherical shape, when the displacement at the position of a height h from the optical axis in the direction of the optical axis is defined as X with the surface vertex as the reference, is represented by $$X = \frac{(1/R)h^2}{1 + \sqrt{\{1 - (1+k)(h/R)^2\}}} + Bh^4 + Ch^6 + Dh^8 + Eh^{10} + Fh^{12}, \ldots$$

where R is the paraxial radius of curvature, k is a conic constant, A, B, C, D, E and F are aspherical surface coefficients, and constants and coefficients not described in the numerical value embodiments are 0.

Also, [e-X] means [×10$^{31\,x}$]. f represents the focal length, $f_{no}$ represents F number, and ω represents a half field angle.

Also, the lens surface given a mark ** represents a diffraction surface, and the phase shape φ of the diffraction surface is given by the following polynominal:

$$\phi(h,m) = \{2\pi/(m \cdot \lambda 0)\}(C1 \cdot h^2 + C2 \cdot h^4 + C3 \cdot h^6 + \ldots),$$

where
h: the height in the direction perpendicular to the optical axis,
m: the diffraction order of diffracted light,
λ0: design wavelength,
Ci: phase coefficient (i=1, 2, 3, . . . ).

Also, the focal length of each lens unit in each embodiment is shown in Table 1 below. In Table 1, fi is the focal length of the ith lens unit, and fij is the focal length of the lens subunit Lij.

(Embodiment 1)

f = 17.51~82.45  fno. = 1:3.6~5.77  2ω = 18.2~75.40

| | | | |
|---|---|---|---|
| r1 = 119.374 | d1 = 1.80 | n1 = 1.84666 | ν1 = 23.9 |
| r2 = 49.289 | d2 = 7.03 | n2 = 1.72916 | ν2 = 54.7 |
| r3 = 530.863 | d3 = 0.13 | n3 = 1.77250 | ν3 = 49.6 |
| r4 = 44.189 | d4 = 5.17 | n4 = 1.52421 | ν4 = 51.4 |
| r5 = 123.773 | d5 = variable | n5 = 1.83481 | ν5 = 42.7 |
| *r6 = 92.506 | d6 = 0.05 | n6 = 1.80400 | ν6 = 46.6 |
| r7 = 81.956 | d7 = 1.00 | n7 = 1.63980 | ν7 = 34.5 |
| r8 = 10.675 | d8 = 5.23 | n8 = 1.60311 | ν8 = 60.6 |
| r9 = −55.217 | d9 = 1.00 | n9 = 1.80518 | ν9 = 25.4 |
| r10 = 29.689 | d10 = 0.13 | n10 = 1.48749 | ν10 = 70.2 |
| r11 = 17.287 | d11 = 5.38 | n11 = 1.59551 | ν11 = 39.2 |
| r12 = −20.368 | d12 = 0.28 | n12 = 1.80440 | ν12 = 39.6 |
| r13 = −18.241 | d13 = 1.00 | n13 = 1.78470 | ν13 = 26.3 |
| r14 = 162.287 | d14 = variable | n14 = 1.65844 | ν14 = 50.9 |
| r15 = stop | d15 = 0.25 | n15 = 1.56384 | ν15 = 60.7 |
| r16 = 29.990 | d16 = 1.00 | n16 = 1.58313 | ν16 = 59.4 |
| r17 = 13.243 | d17 = 3.48 | n17 = 1.49700 | ν17 = 81.5 |
| r18 = −51.074 | d18 = variable | n18 = 1.84666 | ν18 = 23.9 |
| r19 = 35.922 | d19 = 3.60 | | |
| r20 = −19.381 | d20 = 1.00 | | |
| r21 = −26.457 | d21 = variable | | |
| r22 = −31.694 | d22 = 2.53 | | |
| r23 = −13.486 | d23 = 1.00 | | |
| r24 = 251.469 | d24 = variable | | |
| r25 = −58.921 | d25 = 1.00 | | |
| r26 = 44.727 | d26 = variable | | |
| r27 = 47.283 | d27 = 9.13 | | |
| r28 = −25.454 | d28 = 0.15 | | |
| r29 = 50.278 | d29 = 9.26 | | |
| r30 = −20.241 | d30 = 1.40 | | |
| r31 = −205.548 | d31 = variable | | |

| | focal length | | |
|---|---|---|---|
| | 17.51 | 35 | 82.45 |
| d5 = | 2.49 | 13.68 | 29.07 |
| d14 = | 15.14 | 6.94 | 1.22 |
| d18 = | 1.00 | 3.20 | 3.60 |
| d21 = | 1.50 | 5.38 | 9.23 |
| d24 = | 3.04 | 3.04 | 3.04 |
| d26 = | 12.33 | 6.24 | 2.00 |
| d31 = | 35.00 | 43.27 | 48.34 |

| Aspherical Surface Coefficients | | | | |
|---|---|---|---|---|
| | B | C | D | E |
| Surface R6 | 9.1164E−06 | −4.9659E−08 | 1.3037E−10 | 0.0000E+00 |
| Surface R28 | 4.6065E−06 | 5.6601E−09 | −1.5123E−11 | 4.5847E−14 |

(Embodiment 2)

f = 17.51~82.45 o. = 1:4.1~5.77 2ω = 18.2~75.40

| | | | |
|---|---|---|---|
| r1 = 142.785 | d1 = 1.80 | n1 = 1.84666 | ν1 = 23.9 |
| r2 = 53.290 | d2 = 7.40 | n2 = 1.77250 | ν2 = 49.6 |
| r3 = 1231.404 | d3 = 0.12 | n3 = 1.73400 | ν3 = 51.5 |
| r4 = 46.025 | d4 = 4.30 | n4 = 1.52421 | ν4 = 51.4 |
| r5 = 97.332 | d5 = variable | n5 = 1.77250 | ν5 = 49.6 |
| *r6 = 85.432 | d6 = 0.05 | n6 = 1.77250 | ν6 = 49.6 |
| r7 = 75.790 | d7 = 1.20 | n7 = 1.74077 | ν7 = 27.8 |
| r8 = 12.401 | d8 = 5.63 | n8 = 1.69680 | ν8 = 55.5 |
| r9 = −53.760 | d9 = 1.00 | n9 = 1.83481 | ν9 = 42.7 |
| r10 = 22.931 | d10 = 0.15 | n10 = 1.48749 | ν10 = 70.2 |
| r11 = 18.706 | d11 = 5.10 | n11 = 1.48749 | ν11 = 70.2 |
| r12 = −42.374 | d12 = 0.60 | n12 = 1.84666 | ν12 = 23.9 |
| r13 = −27.795 | d13 = 1.20 | n13 = 1.84666 | ν13 = 23.9 |
| r14 = −515.097 | d14 = variable | n14 = 1.72342 | ν14 = 38.0 |
| r15 = stop | d15 = 2.50 | n15 = 1.61272 | ν15 = 58.7 |
| r16 = 32.734 | d16 = 1.20 | n16 = 1.58313 | ν16 = 59.4 |
| r17 = 14.965 | d17 = 3.00 | n17 = 1.49700 | ν17 = 81.5 |
| r18 = −56.078 | d18 = 0.15 | n18 = 1.84666 | ν19 = 23.9 |
| r19 = 22.894 | d19 = 3.11 | | |
| r20 = −22.753 | d20 = 1.20 | | |
| r21 = −29.426 | d21 = variable | | |
| r22 = −51.462 | d22 = 2.00 | | |
| r23 = −16.056 | d23 = 0.80 | | |
| r24 = 63.175 | d24 = variable | | |
| r25 = −17.145 | d25 = 1.20 | | |
| r26 = −29.662 | d26 = variable | | |
| r27 = 97.139 | d27 = 5.80 | | |
| *r28 = −21.571 | d28 = 0.51 | | |
| r29 = 1643.873 | d29 = 4.20 | | |
| r30 = −27.147 | d30 = 1.20 | | |
| r31 = −19.517 | d31 = 1.50 | | |
| r32 = −40.237 | d32 = variable | | |

| | focal length | | |
|---|---|---|---|
| | 17.51 | 35 | 82.45 |
| d5 = | 2.60 | 19.38 | 35.18 |
| d14 = | 19.38 | 7.27 | 1.69 |
| d21 = | 1.47 | 6.61 | 9.64 |
| d24 = | 4.50 | 4.50 | 4.50 |
| d26 = | 9.94 | 4.80 | 1.77 |
| d32 = | 36.96 | 45.31 | 48.10 |

Aspherical Surface Coefficients

| | K | B | C | D | E |
|---|---|---|---|---|---|
| Surface R6 | −29.71720 | 1.3541E−05 | −2.4478E−08 | −4.0312E−11 | 1.7289E−13 |
| Surface R28 | 0.03966 | 6.6435E−06 | −1.2655E−10 | 1.2782E−11 | −3.6919E−13 |

(Embodiment 3)

f = 45.6~182.9 fno. = 1:4.7~5.85 2ω = 13.49~50.79

| | | | |
|---|---|---|---|
| r1 = 58.164 | d1 = 2.38 | n1 = 1.48749 | ν1 = 70.23 |
| r2 = 151.636 | d2 = 0.09 | n2 = 1.74950 | ν2 = 35.33 |
| r3 = 45.567 | d3 = 1.39 | n3 = 1.51633 | ν3 = 64.14 |
| **r4 = 27.997 | d4 = 6.38 | n4 = 1.75047 | ν4 = 52.57 |
| r5 = 32265.515 | d5 = variable | n5 = 1.86091 | ν5 = 37.91 |
| r6 = 563.103 | d6 = 0.63 | n6 = 1.62227 | ν6 = 60.15 |
| r7 = 53.263 | d7 = 0.94 | n7 = 1.84666 | ν7 = 23.93 |
| r8 = 73.823 | d8 = 0.69 | n8 = 1.85751 | ν8 = 34.13 |
| r9 = 29.252 | d9 = 1.21 | n9 = 1.58313 | ν9 = 59.4 |
| r10 = −34.667 | d10 = 0.69 | n10 = 1.73430 | ν10 = 53.41 |
| r11 = 38.419 | d11 = 0.08 | n11 = 1.84666 | ν11 = 23.93 |
| r12 = 37.788 | d12 = 2.04 | n12 = 1.58313 | ν12 = 59.4 |
| r13 = 1217.756 | d13 = variable | n13 = 1.84666 | ν13 = 23.93 |
| r14 = 19.630 | d14 = 0.69 | n14 = 1.48749 | ν14 = 70.23 |
| r15 = 13.291 | d15 = 3.32 | n15 = 1.77368 | ν15 = 50.08 |
| *r16 = −61.570 | d16 = 0.63 | n16 = 1.74571 | ν16 = 52.81 |
| r17 = stop | d17 = variable | n17 = 1.63530 | ν17 = 35.11 |
| r18 = −15.425 | d18 = 1.20 | n18 = 1.83481 | ν18 = 42.72 |
| r19 = 26.979 | d19 = 1.67 | n19 = 1.84666 | ν19 = 23.78 |
| r20 = −186.019 | d20 = variable | | |
| r21 = 63.786 | d21 = 2.81 | | |
| *r22 = −29.717 | d22 = 0.09 | | |
| r23 = 494.358 | d23 = 0.69 | | |
| r24 = 19.290 | d24 = 3.20 | | |
| r25 = −31.616 | d25 = 0.09 | | |
| r26 = 25.367 | d26 = 2.28 | | |
| r27 = −96.489 | d27 = variable | | |
| r28 = 170.237 | d28 = 0.69 | | |
| r29 = 17.629 | d29 = 1.26 | | |
| r30 = 130.661 | d30 = 2.81 | | |
| r31 = −15.482 | d31 = 0.69 | | |
| r32 = 39.656 | d32 = variable | | |
| r33 = 37.950 | d33 = 2.11 | | |
| r34 = 141.617 | d34 = 24.59 | | |

-continued

| | focal length | | |
|---|---|---|---|
| | 45.6 | 83.0 | 182.9 |
| d5 = | 0.81 | 21.49 | 38.67 |
| d13 = | 4.40 | 2.43 | 0.79 |
| d17 = | 2.10 | 6.54 | 10.46 |
| d20 = | 5.75 | 3.27 | 1.00 |
| d27 = | 9.68 | 8.14 | 0.84 |
| d32 = | 1.76 | 3.30 | 10.59 |

Phase Coefficients

| | C2 | C4 | C6 |
|---|---|---|---|
| Surface R4 | −4.8181E−05 | 4.2830E−09 | −2.9069E−12 |

Aspherical Surface Coefficients

| | B | C | D |
|---|---|---|---|
| Surface R16 | −3.451E−06 | 1.278E−08 | −9.416E−10 |
| Surface R22 | 1.206E−05 | −3.630E−08 | 2.726E−10 |

(Embodiment 4)

```
f = 11.0~24.5   fno. = 1:4.1   2ω = 82.95~125.99
*r1  =   0.000       d1  = 2.20        n1  = 1.58313     v1  = 59.4
 r2  =  13.068       d2  = 8.59        n2  = 1.77250     v2  = 49.6
*r3  = −210.982      d3  = 0.82        n3  = 1.84666     v3  = 23.8
 r4  =  16.100       d4  = 1.32        n4  = 1.72825     v4  = 28.5
 r5  =  17.330       d5  = 2.80        n5  = 1.51633     v5  = 64.1
 r6  =  39.818       d6  = variable    n6  = 1.67790     v6  = 55.3
 r7  =  28.494       d7  = 0.76        n7  = 1.72000     v7  = 50.2
 r8  =  11.760       d8  = 3.37        n8  = 1.62230     v8  = 53.2
 r9  = −84.046       d9  = 0.09        n9  = 1.80518     v9  = 25.4
 r10 =  21.652       d10 = 2.20        n10 = 1.43875     v10 = 95.0
 r11 = −56.280       d11 = variable    n11 = 1.83400     v11 = 37.2
 r12 = stop          d12 = 0.68        n12 = 1.48749     v12 = 70.2
 r13 = −65.127       d13 = 0.79
 r14 =  60.786       d14 = 1.08
 r15 = −37.432       d15 = 0.63
 r16 =  16.834       d16 = 1.64
 r17 = 168.8828      d17 = variable
 r18 =  16.965       d18 = 4.23
 r19 = −16.900       d19 = 0.09
*r20 = −121.192      d20 = 0.76
 r21 =  11.711       d21 = 5.49
 r22 = −29.277       d22 = variable
```

| | focal length | | |
|---|---|---|---|
| | 11.0 | 16.3 | 24.5 |
| d6 = | 18.35 | 10.10 | 4.62 |
| d11 = | 0.93 | 3.82 | 6.69 |
| d17 = | 5.36 | 3.01 | 0.10 |
| d22 = | 25.11 | 29.97 | 39.16 |

Phase Coefficients

| | C2 | C4 | C6 |
|---|---|---|---|
| Surface R4 | −4.8181E−05 | 4.2830E−09 | −2.9069E−12 |

Aspherical Surface Coefficients

| | B | C | D | E | F |
|---|---|---|---|---|---|
| Surface R1 | 5.549E−05 | −1.895E−07 | 6.481E−10 | −1.285E−12 | 1.438E−15 |
| Surface R3 | −3.006E−05 | 2.113E−07 | −1.741E−09 | 2.223E−12 | |
| Surface R20 | −7.174E−05 | −2.316E−07 | −4.487E−11 | −3.673E−12 | |

TABLE 1

| 1st Embodiment | | 2nd Embodiment | |
|---|---|---|---|
| Wide-angle end focal length | 17.51 | Wide-angle end focal length | 17.50 |
| telephoto end focal length | 82.45 | telephoto end focal length | 82.48 |
| f1 | 68.02 | f1 | 80.45 |
| f2 | −12.08 | f2 | −13.81 |
| f3 (including stop) | 79.71 | f3 (including stop) | 23.02 |
| f4 | 28.28 | f41 | −49.16 |
| f51 | −56.18 | f42 | −68.82 |
| f52 | −44.94 | f5 | 33.00 |
| f6 | 29.43 | | |
| TS | 1.007 | TS | 1.008 |
| BS (deg/mm) | 0.70 | BS (deg/mm) | 0.70 |

| 3rd Embodiment | | 4th Embodiment | |
|---|---|---|---|
| Wide-angle end focal length | 45.55 | Wide-angle end focal length | 11.03 |
| telephoto end focal length | 182.92 | telephoto end focal length | 24.27 |
| f1 | 74.28 | f1 | −13.26 |
| f21 | −44.94 | f2 | 18.16 |

TABLE 1-continued

| | | | |
|---|---|---|---|
| f22 | −56.55 | f31 (including stop) | −43.55 |
| f3 (including stop) | 33.74 | f32 | −95.12 |
| f4 | −27.39 | f4 | 32.44 |
| f5 | 16.16 | | |
| f6 | −13.95 | | |
| f7 | 58.224 | | |
| TS | 1.194 | TS | 0.487 |
| BS (deg/mm) | 0.37 | BS (deg/mm) | 1.15 |

This application claims priority from Japanese Patent Application No. 2004-171381 filed on Jun. 9, 2004, which is hereby incorporated by reference herein.

What is claimed is:

1. A zoom lens system comprising:
a plurality of lens units, of which the lens unit disposed most adjacent to an object side has positive optical power; and
an aperture stop,
wherein the interval between adjacent ones of the lens units being changed during zooming;
wherein the plurality of lens units include a lens unit of negative optical power disposed on the image side of the aperture stop, the lens unit having negative optical power is composed of two lens components having negative optical power, and one of the two lens components is moved so as to have a component in a direction perpendicular to an optical axis, to thereby change the imaging position of the zoom lens system in a direction perpendicular to the optical axis, and
wherein the following condition is satisfied, $0.25<TS<1.25$, where TS represents the displacement amount of the imaging position of the zoom lens system in the direction perpendicular to the optical axis when the one lens component has been moved by a unit amount in the direction perpendicular to the optical axis.

2. A zoom lens system according to claim 1, wherein the plurality of lens units include in succession from the object side to the image side: a first lens unit having positive optical power; a second lens unit having negative optical power; a third lens unit having positive optical power; a fourth lens unit having positive optical power; a fifth lens unit having negative optical power; and a sixth lens unit having positive optical power; the fifth lens unit being a lens unit constituted by the two lens components.

3. A zoom lens system according to claim 1, wherein the plurality of lens units include in succession from the object side to the image side: a first lens unit having positive optical power; a second lens unit having negative optical power; a third lens unit having positive optical power; a fourth lens unit having negative optical power; and a fifth lens unit having positive optical power; the fourth lens unit being a lens unit constituted by the two lens components.

4. A zoom lens system according to claim 1, which forms an image on a photoelectric transducer.

5. An image pickup apparatus comprising:
a zoom lens system according to claim 1; and
a photoelectric transducer for receiving an image formed by the zoom lens system.

6. A zoom lens system comprising:
a plurality of lens units of which the interval between adjacent ones is changed during zooming,
wherein the plurality of lens units include a lens unit having negative optical power, the lens unit having negative optical power is constituted by two lens components having negative optical power, and one of the two lens components is moved so as to have a component in a direction perpendicular to an optical axis, to thereby change the imaging position of the zoom lens system in a direction perpendicular to the optical axis, and
the following condition is satisfied, $0.25<TS<1.25$, where TS represents the displacement amount of the imaging position of the zoom lens system in the direction perpendicular to the optical axis when the one lens component has been moved by a unit amount in the direction perpendicular to the optical axis.

7. A zoom lens system according to claim 6, wherein the plurality of lens units include in succession from an object side to an image side:
a first lens unit having positive optical power;
a second lens unit having negative optical power;
a third lens unit having positive optical power;
a fourth lens unit having positive optical power;
a fifth lens unit having negative optical power; and
a sixth lens unit having positive optical power,
the fifth lens unit being a lens unit constituted by the two lens components.

8. A zoom lens system according to claim 6, wherein the plurality of lens units include in succession from an object side to an image side:
a first lens unit having positive optical power;
a second lens unit having negative optical power;
a third lens unit having positive optical power;
a fourth lens unit having negative optical power; and
a fifth lens unit having positive optical power,
the fourth lens unit being a lens unit constituted by the two lens components.

9. A zoom lens system according to claim 6, wherein the plurality of lens units include in succession from an object side to an image side:
a first lens unit having positive optical power;
a second lens unit having negative optical power;
a third lens unit having positive optical power;
a fourth lens unit having negative optical power;
a fifth lens unit having positive optical power;
a sixth lens unit having negative optical power; and
a seventh lens unit having positive optical power,
the second lens unit being a lens unit constituted by the two lens components.

10. A zoom lens system according to claim 6, wherein the plurality of lens units include in succession from an object side to an image side:
a first lens unit having negative optical power;
a second lens unit having positive optical power;
a third lens unit having negative optical power; and
a fourth lens unit having positive optical power,
the third lens unit being a lens unit constituted by the two lens components.

11. A zoom lens system according to claim 6, which forms an image on a photoelectric transducer.

12. An image pickup apparatus comprising:
a zoom lens system according to claim 6; and
a photoelectric transducer for receiving an image formed by the zoom lens system.

13. A zoom lens system comprising:
a plurality of lens units, of which the lens unit disposed most adjacent to an object side has positive optical power; and
an aperture stop,
wherein the interval between adjacent ones of the lens units being changed during zooming;
wherein the plurality of lens units include a lens unit of negative optical power disposed on the image side of the aperture stop, the lens unit having negative optical power is composed of two lens components having negative optical power, and one of the two lens components is moved so as to have a component in a direction perpendicular to an optical axis to thereby change the imaging position of the zoom lens system in the direction perpendicular to the optical axis, and
wherein the plurality of lens units include in succession from the object side to the image side:
a first lens unit having positive optical power;
a second lens unit having negative optical power;
a third lens unit having positive optical power;
a fourth lens unit having positive optical power;
a fifth lens unit having negative optical power; and
a sixth lens unit having positive optical power,
the fifth lens unit being a lens unit constituted by the two lens components.

14. A zoom lens system according to claim 13, which forms an image on a photoelectric transducer.

15. An image pickup apparatus comprising:
a zoom lens system according to claim 13; and
a photoelectric transducer for receiving an image formed by the zoom lens system.

16. A zoom lens system comprising:
a plurality of lens units, of which the lens unit disposed most adjacent to an object side has positive optical power; and
an aperture stop,
wherein the interval between adjacent ones of the lens units being changed during zooming;
wherein the plurality of lens units include a lens unit of negative optical power disposed on the image side of the aperture stop, the lens unit having negative optical power is composed of two lens components having negative optical power, and one of the two lens components is moved so as to have a component in a direction perpendicular to an optical axis to thereby change the imaging position of the zoom lens system in the direction perpendicular to the optical axis, and
wherein the plurality of lens units include in succession from the object side to the image side:
a first lens unit having positive optical power;
a second lens unit having negative optical power;
a third lens unit having positive optical power;
a fourth lens unit having negative optical power; and
a fifth lens unit having positive optical power,
the fourth lens unit being a lens unit constituted by the two lens components.

17. A zoom lens system according to claim 16, which forms an image on a photoelectric transducer.

18. An image pickup apparatus comprising:
a zoom lens system according to claim 16; and
a photoelectric transducer for receiving an image formed by the zoom lens system.

* * * * *

UNITED STATES PATENT AND TRADEMARK OFFICE
CERTIFICATE OF CORRECTION

| | |
|---|---|
| PATENT NO. | : 7,126,758 B2 |
| APPLICATION NO. | : 11/149035 |
| DATED | : October 24, 2006 |
| INVENTOR(S) | : Makoto Fujimoto et al. |

It is certified that error appears in the above-identified patent and that said Letters Patent is hereby corrected as shown below:

Column 13, line 15, "[e–X] means [$\times 10^{31\ x}$]" is changed to --[e–X] means [$\times 10^{-x}$]--

Signed and Sealed this

Thirteenth Day of February, 2007

JON W. DUDAS
*Director of the United States Patent and Trademark Office*